US012545302B2

(12) United States Patent
Lefebvre et al.

(10) Patent No.: US 12,545,302 B2
(45) Date of Patent: Feb. 10, 2026

(54) SYSTEM, METHOD AND DEVICES FOR AUTOMATING INSPECTION OF BRAKE SYSTEM ON A RAILWAY VEHICLE OR TRAIN

(71) Applicant: Pennsy Digital Inc., West Chester, PA (US)

(72) Inventors: William Lefebvre, West Chester, PA (US); Ryan Green, Philadelphia, PA (US); Wayne H. Murphy, Pottstown, PA (US); Zachary Ryan Brook, Leola, PA (US)

(73) Assignee: Pennsy Digital Inc., West Chester, PA (US)

( * ) Notice: Subject to any disclaimer, the term of this patent is extended or adjusted under 35 U.S.C. 154(b) by 341 days.

(21) Appl. No.: 18/243,620

(22) Filed: Sep. 7, 2023

(65) Prior Publication Data
US 2024/0075969 A1    Mar. 7, 2024

Related U.S. Application Data

(63) Continuation-in-part of application No. 17/191,545, filed on Mar. 3, 2021.

(60) Provisional application No. 63/012,829, filed on Apr. 20, 2020, provisional application No. 62/984,748, filed on Mar. 3, 2020.

(51) Int. Cl.
*B61L 15/00* (2006.01)
*G01S 13/88* (2006.01)

(52) U.S. Cl.
CPC ....... *B61L 15/0081* (2013.01); *B61L 15/0072* (2013.01); *G01S 13/88* (2013.01)

(58) Field of Classification Search
CPC ............ B61L 15/0081; B61L 15/0072; B61L 15/0027; G01S 13/88; G01S 13/86; G01S 13/06; B60T 13/665; B60T 17/228
See application file for complete search history.

(56) References Cited

U.S. PATENT DOCUMENTS

2021/0061247 A1*   3/2021   Koziol ................. B60T 17/228

* cited by examiner

*Primary Examiner* — Aniss Chad
*Assistant Examiner* — Chase L Cooley
(74) *Attorney, Agent, or Firm* — Bonini IP Law, LLC; Frank J. Bonini, Jr.

(57) ABSTRACT

A system, methods and devices for automating inspection of a brake system on a railway vehicle, such as a freight car or train of a plurality of cars is provided. According to preferred embodiments, the system may be configured for use in conjunction with existing braking systems currently on railway vehicles, such as those on freight cars and other railway vehicles. The system, methods and devices comprise a wireless brake monitoring sensor that includes a radar unit or circuitry and directs a beam toward targets that designated as one or more brake assembly components or locations on the components to monitor a condition or position of a brake or brake component.

23 Claims, 18 Drawing Sheets

SYSTEM, METHOD AND DEVICES FOR AUTOMATING INSPECTION OF BRAKE SYSTEM ON A RAILWAY VEHICLE OR TRAIN

CROSS-REFERENCE TO RELATED APPLICATIONS

This application is a continuation-in-part of and claims benefits of priority under 35 U.S.C. §§ 119(e) and 120 to U.S. application Ser. No. 17/191,545, filed on Mar. 3, 2021, U.S. Provisional Application Ser. No. 62/984,748, filed on Mar. 3, 2020, and U.S. Provisional Application Ser. No. 63/012,829, filed on Apr. 20, 2020, the complete contents of which applications are incorporated herein by reference.

BACKGROUND OF THE INVENTION

1. Field of the Invention

The invention relates to the field of railway vehicles, and more particularly to braking systems of a freight car or train and the inspection of the system and brakes.

2. Brief Description of the Related Art

Typically, most freight cars have a braking system that may be applied in one of two ways, via a pneumatic air braking system or through a mechanical hand brake. Typically, air brakes are used in a train and hand brakes are applied on individual freight cars to secure them in yards or sidings. Currently, there are standards and requirements regulating under which circumstances the hand brakes need to be applied. The regulations are largely to promote safety.

When freight cars are assembled into a train, a mandatory test of the air brake system must be conducted on each train and each car in the train by a qualified person. The brakes on each car should apply in response to an initiation by a controlling locomotive or yard test device and should remain applied until a release signal has been given. Air brakes use a pneumatic cylinder and a piston to apply or release the brakes. Piston travel must be inspected on each freight car while the brakes are applied to confirm they have been actuated and that they are properly adjusted. Cars that fail the inspection must be repaired or removed from the train. This manual, visual inspection process takes time and is often conducted in difficult circumstances, requiring the diligence of qualified person. The inspector is typically required to walk the length of the train in order to inspect each car. No record of the inspection is generated.

In yards where freight cars are disconnected from a train, individual cars must be secured using a mechanical hand brake assembly. Before disconnected freight cars are moved within the yard, the hand brake must be released. Failure to do this causes damage to the wheels on the freight car, damage which may be observed and rectified almost immediately or damage that may take months or years to become evident. Determining whether the hand brake is applied or released when it should be, again relies on visual inspection with no record being maintained.

In some circumstances hand brakes are applied on several freight cars in a train when the train needs to be secured in a stationary location for long periods of time. In these circumstances the hand brakes are applied as a back up to the air brake system. The number of hand brakes applied is important to prevent a runaway train in the event the air brakes fail. It is also important to ensure that all hand brakes are released before the train resumes its journey. In both cases, the process for securing and releasing the train is manual, as is recording that it has been done.

The ability to automate the manual inspection process currently used benefits railroad train operators and railcar owners alike. Providing an automated, digital method to inspect that the brakes work, are adjusted correctly, are applied and released when they should be will lead to safer and more efficient railroad operation.

Previous approaches to fulfilling this need include Electronically Controlled Pneumatic (ECP) brake systems, camera-based image recognition systems and wireless sensor systems using strain gages or distance sensors. While each approach has its own merits, none have been widely adopted.

ECP brakes are costly, hard to use with mixed (partially equipped) fleets and are difficult to retrofit on existing cars. Vision-based systems using image recognition are growing but are expensive and require sites to be equipped and maintained so do not work in all the use-cases outlined above. Strain-based wireless sensing solutions require a modified component equipped with a strain gage to be put in the load path and only validates that the component load changed, not that the piston has moved. Displacement sensors such as string-pots are not robust enough for the rail environment as are magnetic sensors, while optical sensors are unable to operate effectively in the dusty and dirty railroad environment.

SUMMARY OF THE INVENTION

A system, methods and devices for automating inspection of brake system on a railway vehicle, such as a freight car, passenger car, or train comprised of a plurality of cars, is provided. According to preferred embodiments, the system may be configured for use in conjunction with existing braking systems currently on railway vehicles, such as freight cars and other railway vehicles. The system, methods and devices comprise a sensor which according to preferred embodiments, preferably comprises a wireless sensor.

The system, methods and devices may be used to monitor a condition of a brake to determine whether a brake component is worn or is suitable for continued operation, and also may determine the state of the brake (i.e., whether the brake is engaged or disengaged). According to implementations, the devices may be configured to monitor one or the other or both the brake state and brake condition, and may be selectively operated or actuated to monitor the state, condition, or both at the same time, or at different times or intervals, or in response to different events. As discussed herein, associated sensors, such as a GPS sensor or accelerometer may be utilized in conjunction with the wireless brake monitoring devices, to provide a trigger to measure or not measure a condition or state.

The wireless brake monitoring sensors preferably includes a radar mechanism, such as radar circuitry or a radar unit, to transmit radar signals (high frequency RF electromagnetic radiation) and monitor the brake condition through the feedback from the timing of the radar signals, such as echoes off one or more targets.

According to a preferred implementation, the system may be employed in conjunction with both the main braking system of a railway vehicle (e.g., a freight car pneumatic brakes), as well as the hand brake of the railway vehicle. According to an exemplary embodiment, a first wireless sensor may be provided for measurement of the main brake and a second wireless sensor provided for measurement of the hand brake. The main brake may be measured by monitoring a property of the brake application, such as the piston travel distance. This is measured by the wireless brake monitoring sensor employing a radar unit to track the distance.

In an implementation of the device, system, and method, the wireless sensing devices may be mounted or installed on existing components of the railway vehicle, including the braking system of the railway vehicle. According to some embodiments, a modified braking component, such as a brake pin, may be configured to retain the wireless sensor thereon. The invention also provides signaling brake pins that are configured to implement the wireless monitoring.

According to an exemplary implementation, a railway freight car is provided with two wireless brake monitoring devices. One device may be attached to a modified brake pin, for body mounted brakes, or to the measuring plates of a truck mounted braking system. According to some other embodiments, the device may be attached to another suitable component or location. In this exemplary implementation, the other or second wireless brake monitoring device may be attached to another modified brake pin (used to install the hand brake) to measure changes in the position of the pin (e.g., a distance traveled) when the hand brake is applied. In both cases, the distance measurement relies on a low power radar sensor that uses reflections from other components on the freight car body, truck or braking system.

The wireless brake monitoring sensing devices preferably obtain a distance measurement which relies on a low power radar sensor that uses reflections from other components on the freight car body, truck or braking system, or in some embodiments, a target that is installed on the railway vehicle (or brake system thereof).

The wireless sensors may communicate signals locally, directly or via a mesh network, from the devices to a multiplicity of receivers (gateways) based in a yard, on the train, on the freight car, to a qualified person's mobile device, to a yard-based vehicle or even though a drone. Alternatively, the sensors may be equipped with a low power wide area networking (LPWAN) capability such as cellular-based solution (LTE Cat-M1 or NB-IOT for instance) or a public or private LPWAN technology such as LoraWAN or Sigfox. Other suitable communications protocols may be used, and preferably ones that may operate using low power. A communications module or chipset may be provided as part of the wireless brake monitoring sensor.

According to some embodiments, the method includes configuring the system to work on different types of freight cars, and when the devices are installed, determining the brake state and when brake adjustments are needed. The information provided by the wireless sensing devices may be communicated to a suitable remote device, and preferably a wireless device that may reside in the yard, be carried on a yard vehicle (such as a truck or car), or in a structure or fixture of the rail yard, or other suitable location where brake inspections are to be typically carried out. However, the transmission or exchanges may also be communicated from a local node or device to a remote or distant location through a network (cellular, VPN, Internet, etc.)

The system and devices may be mounted on an existing or modified railway vehicle or braking component, and the beam of the sensor may be directed or focused on a desired predetermined area where the brake component, such as, for example, a piston or other associated part, may travel. The radar sensor may be configured to throw a beam in a desired window or range (where the expected operation of the brake component, such as the piston) is being monitored) and detect the position of a brake component, such as a brake piston or other element. According to some embodiments, the sensor may be mounted to detect movement based on a fixed element, where a target element is provided, and where the sensor is directed to project a beam toward the target, and detect a distance that the target is or may have moved to. The sensor detects the brake position and/or movement of the brake component such as for example, the piston, and the information is made available to one or more processing components to determine the status of the brake. The sensor may be configured to wirelessly communicate with a remote unit, such as a mobile device, tablet or other device.

According to some embodiments, the wireless brake monitoring sensor may be trigger based, with its operation based on a particular response to an external event or measurement, such as an output from an associated sensor. The sensor or event trigger may trigger a brake monitoring measurement to be taken, or it may prevent one. In these embodiments, power is conserved and/or reduced by having the brake monitoring sensor selectively operated. For example, the wireless brake monitoring sensor may be configured to include one or more of GPS chips, accelerometers (such as an accelerometer-based motion sensor) to trigger or prevent measurements.

According to some preferred embodiments, the sensor comprises a radar unit to obtain a distance measurement, and the radar unit relies on a low power radar sensor that uses reflections from other components on the freight car body, truck or braking system to determine the distance measurement. According to some preferred embodiments, the radar unit may provide millimeter accuracy over ranges exceeding 1 m and, preferably is enclosed in a housing or enclosure and is unaffected by dust and dirt.

The present system, method and devices automate the brake inspection process by providing a monitoring solution using low power radar sensors to detect and provide indications of the brake condition and status. Brake monitoring may be carried out by receiving signals generated by the monitoring devices. A remotely situated receiver, such as for example, a tablet, smart phone, computer, may receive or exchange communications with the radar sensors. A single car or multiple cars on a train, and their respective brake conditions, including air brakes as well as hand brakes, may be identified using the monitoring system and radar devices.

According to some preferred embodiments, the system method and devices for monitoring a brake system of a railway vehicle may be applied to or installed on existing railway vehicles without the need for welding, drilling or modification of the rail car components. The devices and system also may be retrofitted to existing railway vehicles and brake components.

Embodiments of the devices may be deployed in conjunction with standard body mounted brake rigging, which uses only two sizes of brake pins. The radar sensors may be mounted or installed as part of the brake pins.

According to some embodiments, the radar sensors may be installed on a mount that is configured to attach to an existing braking system assembly, and, according to some embodiments is mounted on the brake assembly using a pin that mounts one or more other components of the brake assembly, such as, for example, the pin that connects the piston rod of the piston assembly with the brake lever.

The system, methods and devices may be used to facilitate brake inspections, and provide determinations of braking status, such as whether the hand brake is applied or released, whether the air brake (pneumatic brake) is applied or released, and/or whether both brake actuators (hand brake and pneumatic brake) are applied or both are released. The sensor and sensor circuitry preferably are configured to obtain the signal data that corresponds to one or more locations on the brake assembly to determine the extension of the piston rod, as well as the location of the piston rod travel or piston travel from the cylinder or reservoir. The system, methods and devices may be configured to provide notifications, which according to some embodiments may be communicated through or handled by a gateway through an end of train or yard system, as well as, or additionally or alternately, to a user to a local device, such as a smart phone.

The air brake state may be monitored and measured for pre-trip inspection using the inventive system, methods and devices. The air brake state may be used to implement an automated pre-trip inspection of cars on a train. The system, method and devices monitor and determine the state of the air brake. This is carried out with the sensor and radar signals generated therefrom, which are processed to determine the distance of the air brake piston travel. Piston travel of a brake piston of an air brake cylinder is a Federal Railroad Administration ("FRA") required measurement that needs to be made periodically, to be inspected to make sure the piston does not have to come out too far. For example, one FRA regulation for brakes on rail cars, 49 C.F.R. § 232.12(f)(1), is that at initial terminal piston travel of body-mounted brake cylinders which is less than 7 inches or more than 9 inches must be adjusted to nominally 7 inches. Another requirement, for example, according to FRA, DOT regulation, 49 C.F.R. § 229.55, is that the brake cylinder piston travel is required to be sufficient to provide brake shoe clearance when the brakes are released. In addition, the requirement of this regulation also provides that when the brakes are applied on a standing locomotive, the brake cylinder piston travel may not exceed 1.5 inches less than the total possible piston travel. Another FRA requirement is that the minimum brake cylinder pressure shall be 30 pounds per square inch. If the piston travel exceeds the threshold requirements, such as a range, or requirement, then a brake adjustment is needed. For example, a piston travel requirement may be required to travel between 7 to 9 inches. In the event that the piston travel is outside of the prescribed range, or other FRA or regulatory range, the system and devices may determine that the brake condition is not met, or that the mandated thresholds are not within the prescribed tolerances. Alerts or other indicators may be generated and/or communicated so that the brake condition may be remediated by personnel or other adjustments.

A typical truck mounted brake system with measuring plates are used with the brake monitoring wireless position sensor.

The position sensor devices may be used in association with tablets, smart phones, as well as asset trackers and/or powered gateways, or one or more combinations of these components to comprise a monitoring system. The brake monitoring system and its components may be provided as part of or in association with other communications components and data systems.

BRIEF DESCRIPTION OF THE DRAWING FIGURES

The following figures are provided and described herein:
FIG. 1 is a perspective view of an exemplary embodiment of a wireless position sensor for a railway brake according to the invention.

DETAILED DESCRIPTION OF THE INVENTION

Referring to FIGS. 1 to 15, embodiments of a wireless brake monitoring system and devices are illustrated. In addition, attached as Appendix A are slides disclosing exemplary embodiments and illustrations of the systems, methods and devices of the invention.

Figure 1:
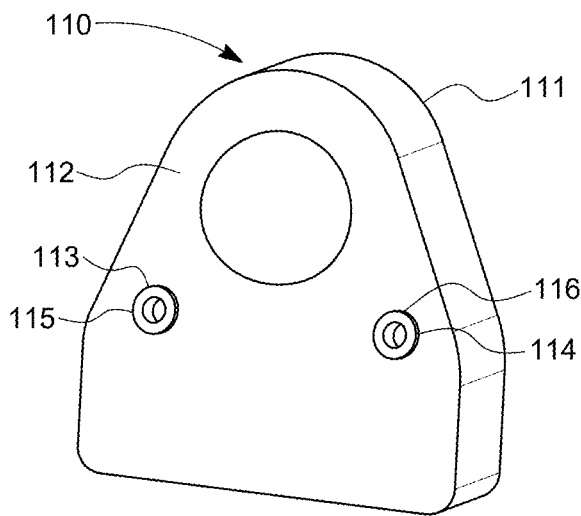

As illustrated in FIG. 1, a monitoring device 110 according to an exemplary embodiment is shown comprising wireless brake sensor 111. The sensor 111 is configured as a unit having a housing 112 for housing components therein and protecting the interior space and components from dirt, debris, and water and moisture intrusion. According to some embodiments the device 110 is configured with a mounting means for mounting the device 110 to another component or structure, such as for example, a railway vehicle (e.g., freight car). A suitable mounting mechanism may be used to mount the device 110 to a structure. Welding, adhesives (e.g., including tapes), and/or magnetic means, such as magnets may be used to secure the device 110 to a structure of the railway vehicle or braking system. The device 110 is shown having mounting means, which according to an exemplary embodiment depicted, comprises a pair of bolts 113, 114, which are shown extending through apertures 115, 116 provided in the device housing 112. The apertures 115, 116 may be configured with counterbores to respectively receive the heads of the bolts 113, 114. The housing 112 preferably seals around each aperture 115, 116 to seal out water, dirt and debris. Matingly threaded bores may be provided on a structure, or mount to which the wireless brake monitoring device 110 may be mounted (see e.g., FIGS. 5, 6, 7, 9-15). As is shown and described herein, according to some embodiments, the devices 110 may be mounted to a modified brake pin. (See e.g., FIGS. 8 and 9)

The device 110 includes at least one power supply for powering the device components that are responsible for emitting signals and detecting the signals and reflections off of the targets, such as railway vehicle structure, brake component or installed target surface (e.g., metal surface or structure provided to serve as a target). According to preferred embodiments, the wireless brake monitoring device 110 comprises a radar unit with radar processing components and/or circuitry therein. According to preferred embodiments the device 110 utilizes a battery as a power source, which is housed within the device housing 112. The battery preferably is a low discharge, long-life battery. One example of a suitable battery is a lithium thionyl chloride type battery.

The device 110 includes suitable circuitry for generating and monitoring a brake condition via generating radar signals and directing those signals at an appropriate target to determine a condition of a brake due to the position of one or more elements of the brake system or structure movable therewith. The radar signal preferably is tuned (in power, as well as frequency, modulation or other parameter) to cover a distance within which monitoring is desired to take place. According to some implementations, the radar signal is directed at a target, which may be a surface or structure that corresponds with the brake movement or status condition of the brake (engaged, disengaged, worn, in need of replacement, or other detectable parameter).

According to preferred embodiments, the device includes circuitry powered by the power supply, such as the battery. The circuitry includes a radar signal generator, and processing components for processing the radar signals, and communications components for communicating the information to a remote component, and according to some embodiments, to receive communications from a remote component. Examples of the device circuitry may include a radar signal generator or transmitter and receiver, transceiver and one or more antennas. The device components may be in an integrated circuit or chip that includes the components needed to process and emit the radar beam and to detect the reflected beam, as well as handle other operations of the radar processing or adjustment. The components may include a radar signal generator and antennas as well as software or other instructions for processing the signals and communicating them to a remote component. For example, a microcontroller or microprocessor may be provided as part of the circuitry. Software including embedded logic, as well as microprocessors, microcontrollers, microcircuits, containing instructions for instructing a microprocessor or processor to process, store and/or communicate the radar signals, may be employed to comprise the circuitry within the unit 110.

According to some preferred embodiments the radar unit is provided in the form of an integrated circuit that is prepared for the conditions and distances of the brakes and brake components, and or target locations, for a typical installation on a railway vehicle (e.g., such as a freight car, passenger vehicle, rail inspection vehicle, or other rail traveling car for which brake monitoring is desirable or beneficial.

The device 110 also includes a communication component, such as for example, a low energy wireless signal transmitter/transceiver, which preferably allows for at least the signal from the wireless sensor device 110 to be transmitted and received by a remote device (e.g., smart phone, tablet, computer, yard station), and preferably allows for two way communications between the sensor 110 and a remote device. A suitable communications component includes a low power signal transmission mechanism (examples of which include Bluetooth® or compatible modules). The brake monitoring sensor devices may be equipped with a low power wide area networking (LPWAN) capability such as cellular-based solution (LTE Cat-M1 or NB-IOT for instance) or a public or private LPWAN technology such as LoraWAN or Sigfox. Other suitable communications components and/or protocols may be used, and preferably ones that may operate using low power may be used.

Figure 5:
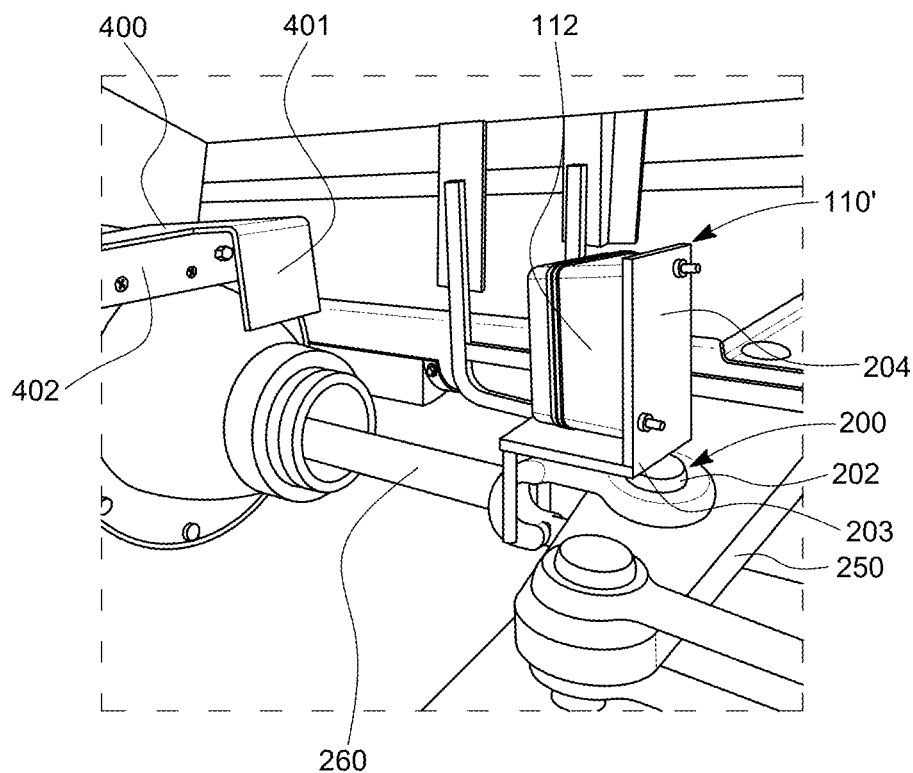
FIG. 5 is a perspective view showing an exemplary embodiment of a brake system monitor installed with a brake system to sense brake cylinder movement on a body mounted brake cylinder.
Figure 6:
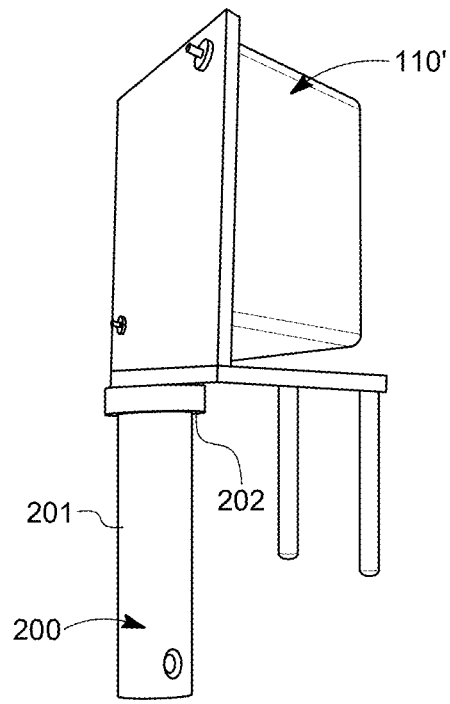
FIG. 6 is a perspective view of a first embodiment of a wireless brake system monitoring device shown comprising a brake system sensor.
Figure 7:
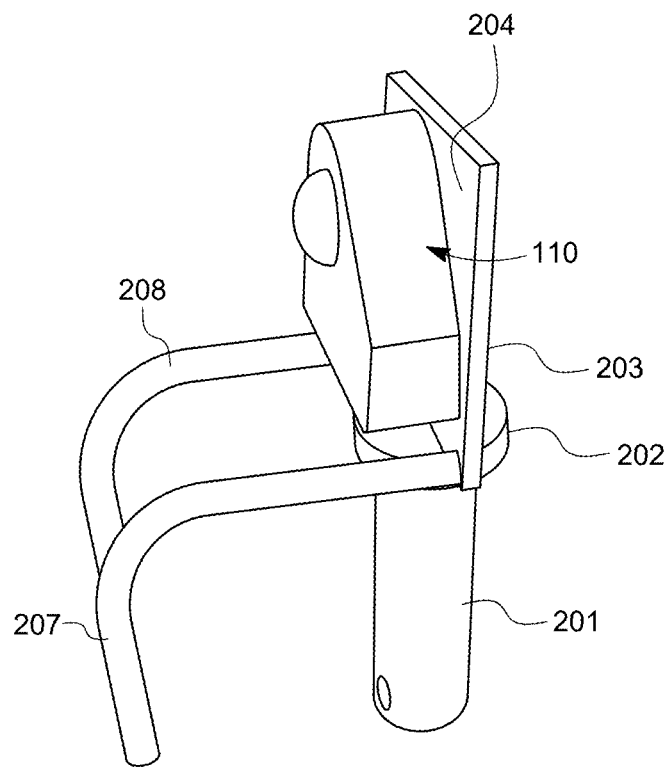
FIG. 7 is a perspective view of a second embodiment of a wireless brake system monitoring device shown comprising a brake system sensor.

The device 110 is shown in an implementation where the device 110 is installed on a brake system of a railway vehicle. According to preferred embodiments, the device 110 may be installed on a brake pin. Referring to FIGS. 5-11, the device 110 (and device 110') is shown installed on a brake pin 200. The brake pin 200 includes a pin body 201, a head 202, and a flange 203 connected to the head 202 (see, e.g., FIGS. 6 and 7) The flange 203 is shown having a mounting surface 204 onto which the sensor device 110, 110' is mounted. The flange mounting surface 204 preferably has suitable mounting bores which for the device 110 are similar to those shown in FIGS. 5 and 6 but on the flange 204 located to align with the device bores 115, 116. The bores 115, 116 receive the mounting bolts 113, 114, respectively, therein to secure the sensor device 110 to the pin 200 (or the device 110' to the pin 200, as shown in FIGS. 5 and 6). Although the bolts 113, 114 are shown as an exemplary mounting mechanism, alternate mechanisms for securing the device 110 to the brake pin 200 may be used. In the embodiments illustrated, the brake pin 200 includes a pair of arms 207, 208 which stabilize the pin against rotational movement to keep the sensor device 110 in proximity to the intended target.

Figure 2:
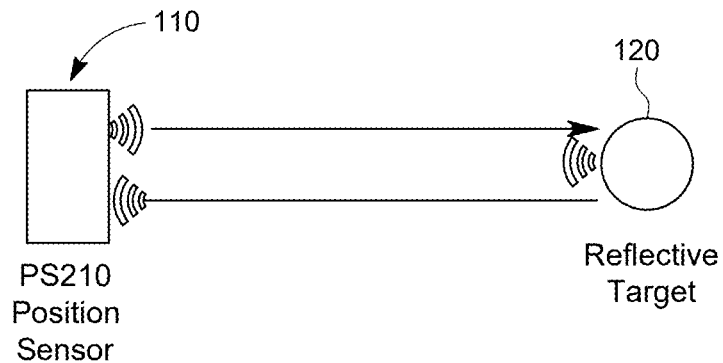
FIG. 2 is a schematic depiction of a wireless position sensor showing a target and RF waves.

As illustrated in FIG. 2, a schematic diagram is depicted to represent the sensor device 110 in an arrangement with a target 120, which may be a brake system component, and preferably its surface, or the surface of a target item installed on the railway vehicle brake system or other location on the vehicle whose distance from the sensor depends on a condition of the associated brake (e.g., whether engaged or disengaged, or worn, or some other condition being monitored via the sensor). The wireless sensor device 110, which comprises a radar unit, projects a beam at the target 120, which is reflected back to the sensor device 110. This may be done continuously or in pulses, as desired when taking measurements, or may be programmed to be carried out autonomously. The radar signals obtained using the device 110 preferably are processed to determine a target distance, which is identified to determine a condition of the brake being monitored. The distance preferably corresponds with the brake or brake component location. In some implementations a baseline condition is first recorded, and relative positions are determined from that baseline. According to some other implementations, the radar unit is configured to detect a range and determine whether the target is within the detection range, which may indicate a condition or the absence of a condition (e.g., brake applied, brake released, brake worn, brake sufficient, brake in need of maintenance).

Figure 3:
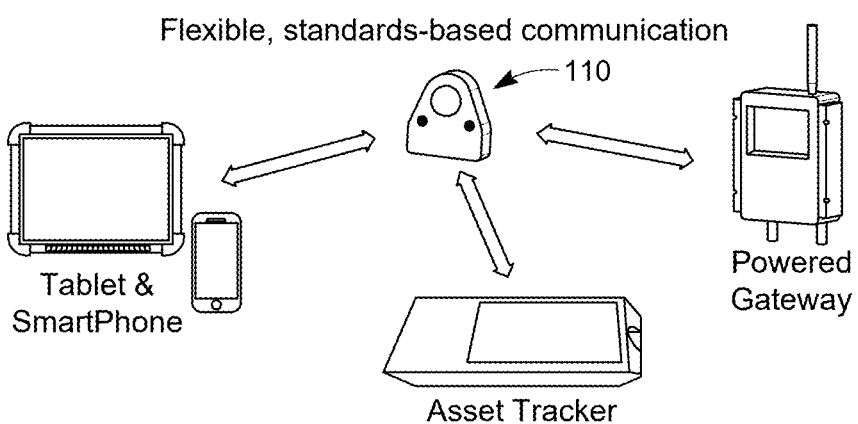
FIG. 3 is a schematic illustration of some exemplary communications exchanges that may be implemented using the wireless position sensor.
Figure 4:
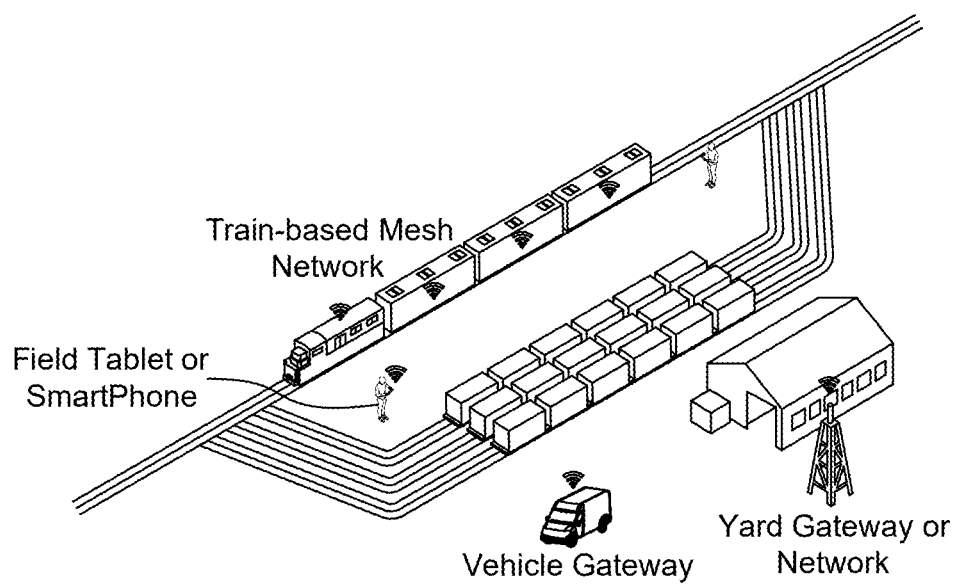
FIG. 4 is a schematic illustration of further exemplary communications exchanges that may be implemented using the wireless position sensor, including an exemplary design for compatibility with AAR Architecture and Theory of Operation for Railroad Sensor Network—AAR RESC Motes Technical Advisory Group.

As shown in FIG. 3, the wireless sensor device 110 preferably is configured to include a communications component or module to send and/or receive communications with a remote device, including for example, any of the remote devices depicted in FIG. 3 and FIG. 4. In FIG. 4 the wireless signal icons represent potential communications points or nodes where wireless brake monitoring device sensors (such as 110, 110') are located on the railway vehicle, and exemplary locations of other wireless devices that may communicate with each other and with the wireless sensor devices 110, 110'.

Referring to FIG. 5, an embodiment of a wireless brake monitoring sensor device 110' is shown mounted on a brake system 300 of a railway vehicle, and faces a target 400. The radar sensor device 110' is similar to the device 110 shown and described but includes an alternate housing 112'. A brake pin 200 with the brake sensor device 110' thereon is installed on the brake system of the railway vehicle. In the illustrated embodiment, the brake sensor device 110' is mounted along with the brake pin 200. A target 400 is shown comprising a metal surface 401 on a structure 402 at a location spaced apart from the wireless radar sensor device 110'. The wireless sensor device 110' includes a radar unit and circuitry, and is shown mounted on the brake arm 250, with a brake piston 260 being shown connected to the brake arm 250. The brake piston 260 changes position and causes the radar unit and target to be at different distances relative to each other. The radar sensor device 110' is used to monitor the brake position and/or change in brake position. The sensed brake condition, which may be a position of the brake as determined by the brake piston or other component, may therefore indicate whether the brake is applied or released, or other condition. In the case where the inspection of the brake is to be carried out. The radar sensor device 110' may be actuated to provide a reading of the target (which in this example in FIG. 5) is the brake piston 260 position or location, based on the target 400. The sensor 110' wirelessly communicates the information to a remote device such as a cell phone, tablet or other suitable device providing an indication as to the brake condition or status.

For example, where the piston extension indicates that a brake pad is likely to be worn due to the extension to apply the brake, then the signal providing that information also may indicate a wear condition of the brake.

The device and system and method may be configured to detect ranges of a brake system component, such as the brake piston, and provide monitoring to determine whether the piston reaches a threshold that is indicative of a wear condition, or other problem.

Figure 8:
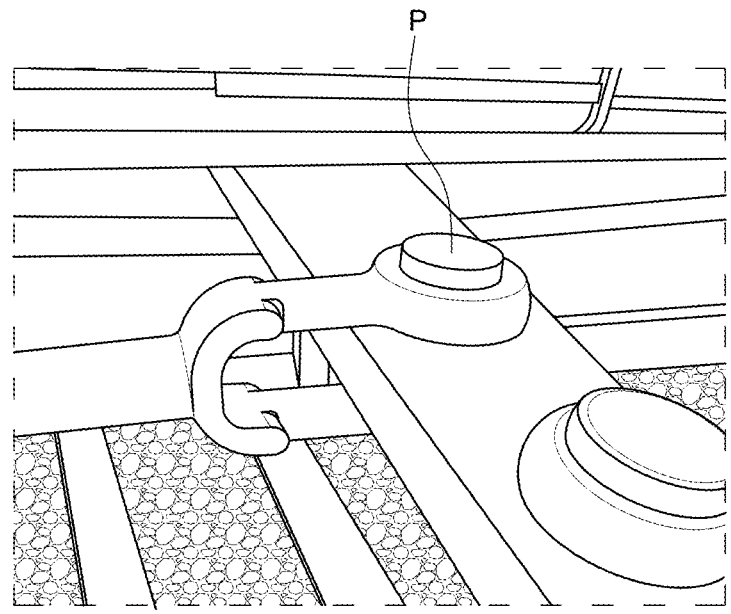
FIG. 8 is an exemplary illustration of a portion of a brake system showing a brake pin.
Figure 9:
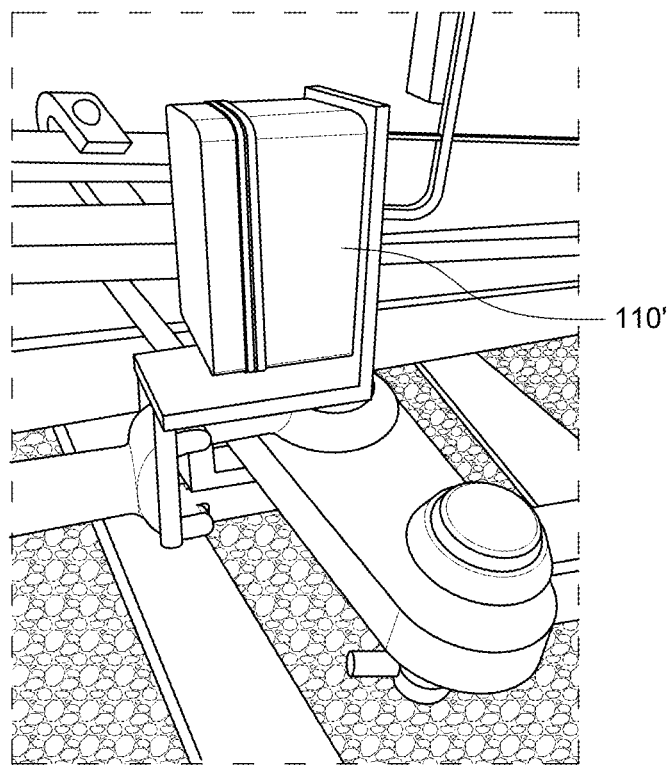
FIG. 9 is an exemplary illustration of the portion of a brake system of FIG. 8, showing a brake system sensor mounted with a brake pin.

Referring to FIGS. 8 and 9 an example of a retrofit installation of the present devices is depicted, in FIG. 8 showing the typical standard brake pin "P", and in FIG. 9 showing replacement of the standard pin "P" with the new pin 200 that includes the wireless brake monitoring sensor device 110'. The system and method may be carried out by replacement of the brake pin ("P") to provide a wireless sensor that communicates the condition of the existing brake system of the railway vehicle.

Figure 10:
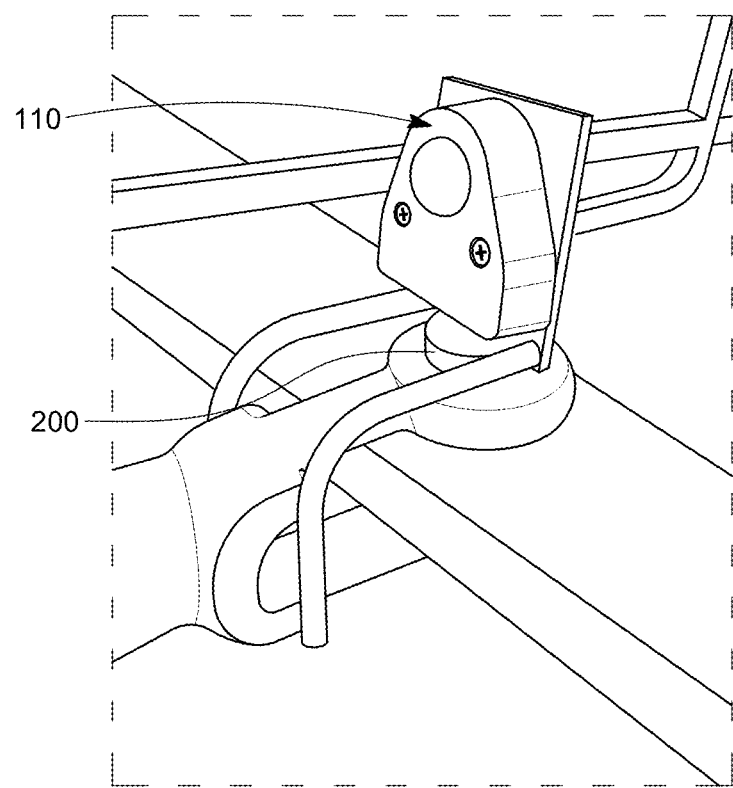
FIG. 10 is a perspective view of the wireless brake position sensor of FIG. 1, shown in an installation on a brake system of a railway vehicle.
Figure 11:
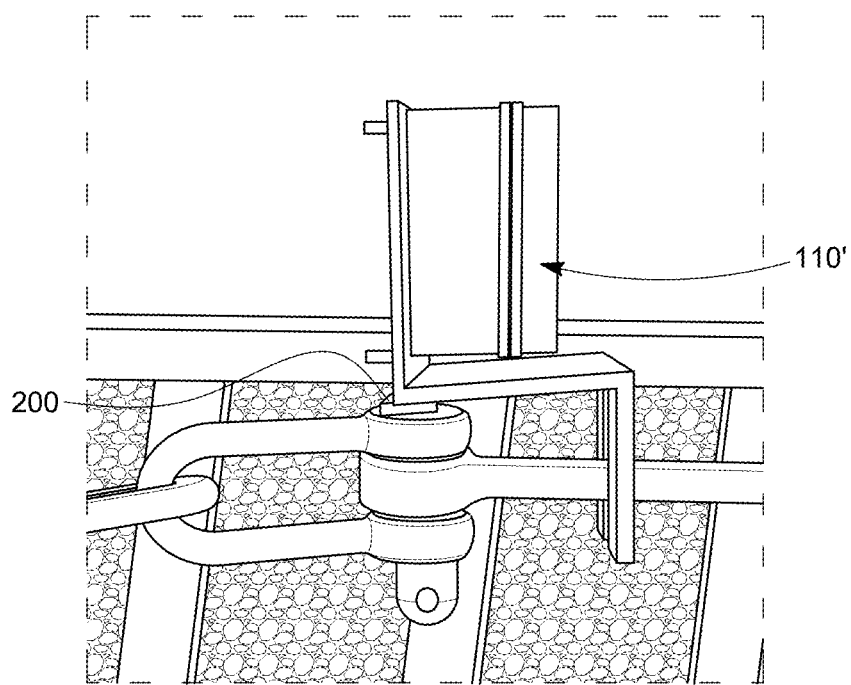
FIG. 11 is a perspective view of a portions of a brake system showing the wireless sensor of FIG. 6 mounted on a brake pin that includes a mounting means for the sensor, the brake pin shown being installed in a hand brake of a railway vehicle.
Figure 12:
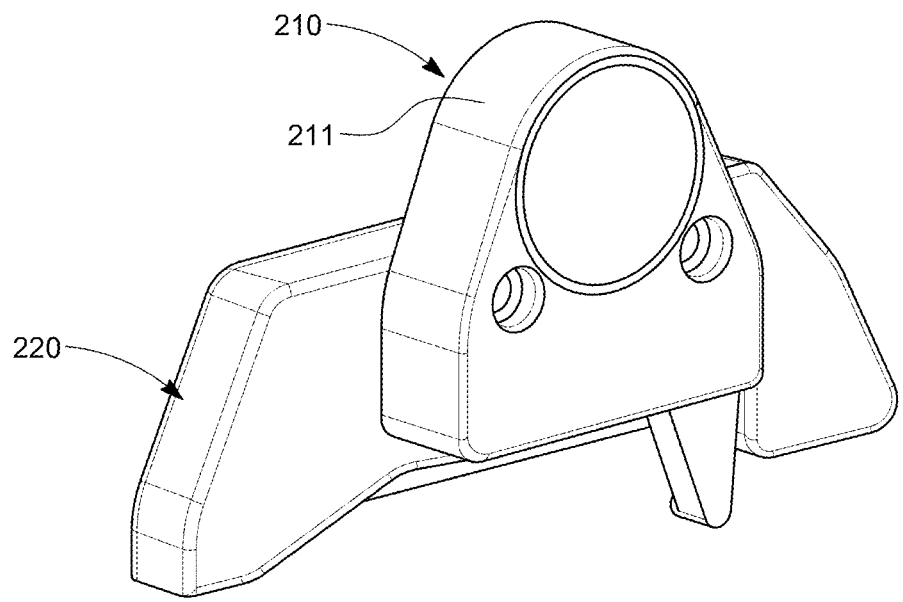
FIGS. 12 and 13 are illustrations of the wireless brake monitoring sensor configured for use on truck mounted brakes of a railway vehicle.
Figure 13:
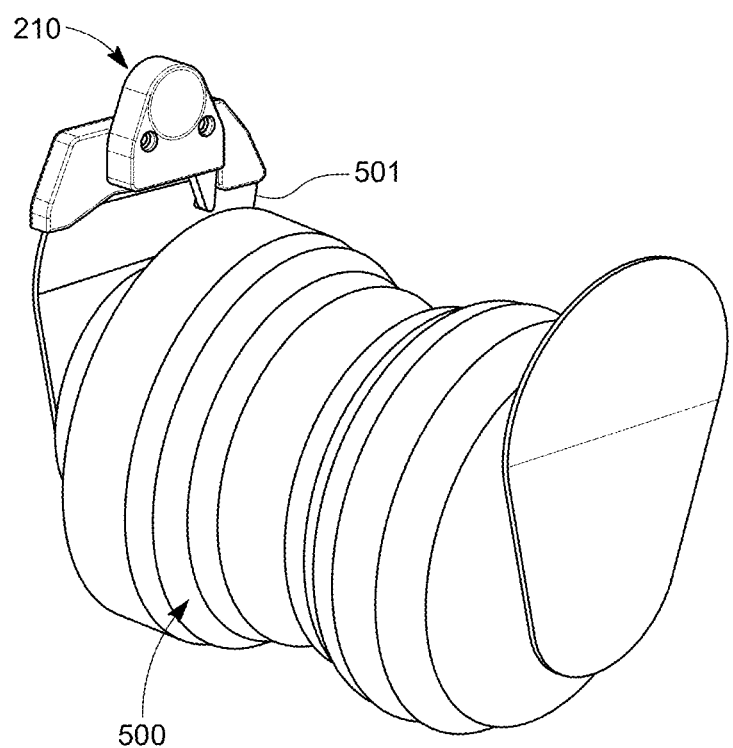

FIG. 10 depicts the sensors 110 and pin 200 shown for use with body mounted brakes, and FIG. 11 shows an example of the sensor 110' and pin 200 used to monitor a hand brake.

Figure 14:
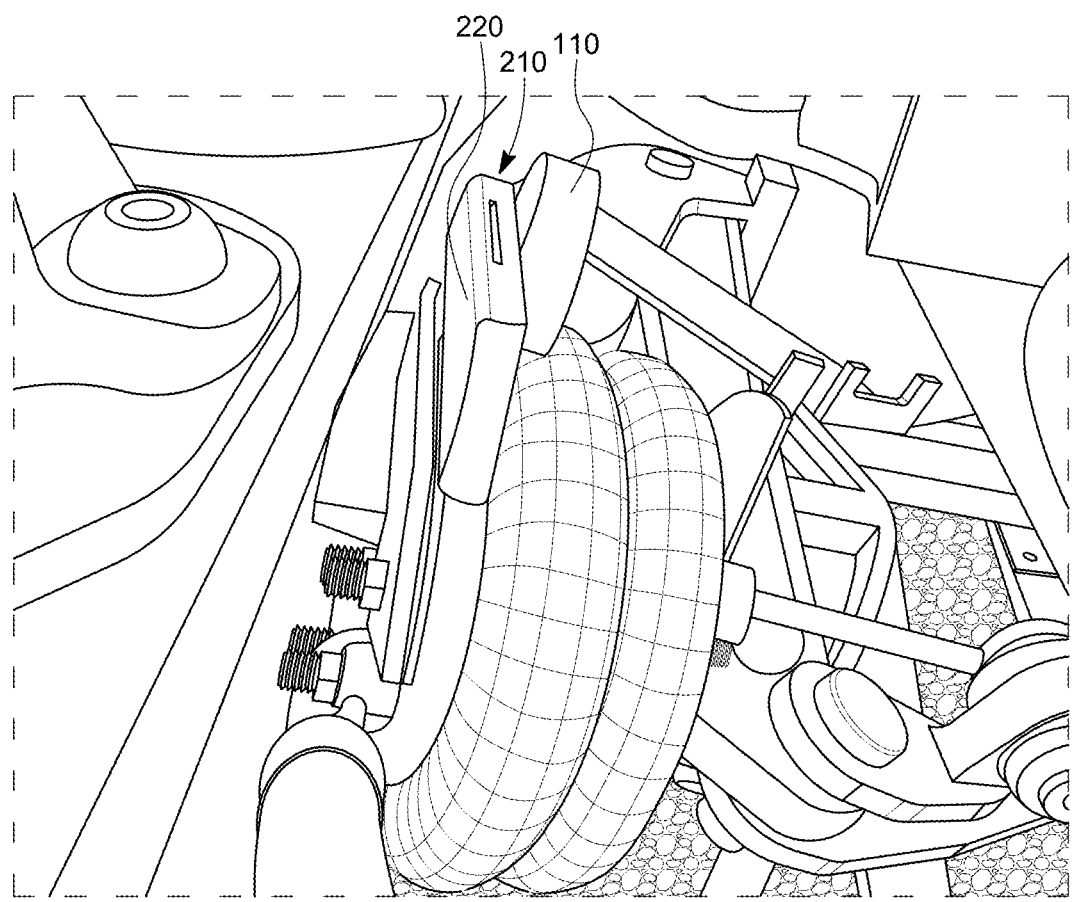
FIGS. 14 and 15 are further illustrations of the wireless brake monitoring sensor configured for use on truck mounted brakes of a railway vehicle shown installed on a measuring plate.
Figure 15:
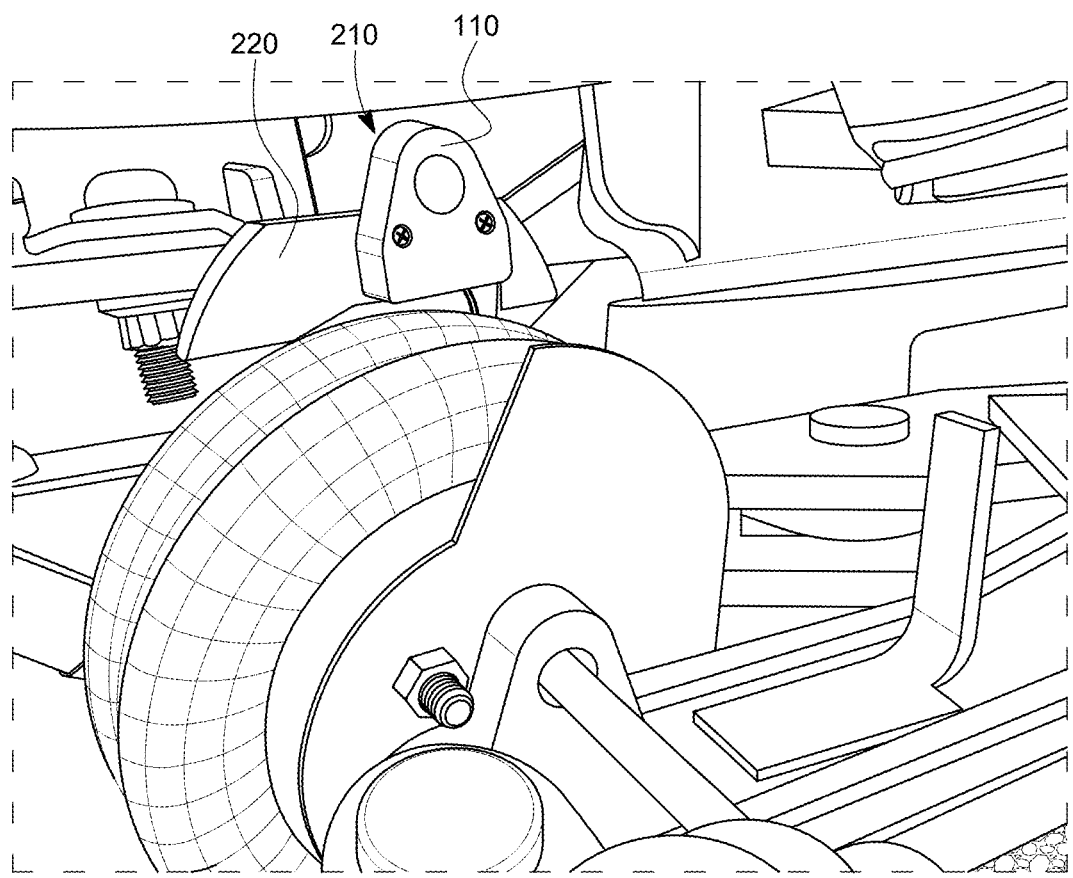

The devices, systems and methods are implemented in embodiments shown in FIGS. 12-15 in conjunction with a truck mounted brake (TMB) 500, with the wireless brake monitoring sensor 210 configured similar to the sensors 110, 110' shown and described herein, including a housing 211 and a mounting component comprising a clip 220 for securing the device 210 to a measuring plate 501 of a brake system 500. The device 210 also may be constructed using the device 110, as shown in FIGS. 14 and 15. As illustrated in FIGS. 14 and 15, the sensor 210 is mounted on the measuring plate 501, and includes the device 110 which is mounted to the clip 220. The radar beam from the device 210 (or the unit 110) is projected at a target to monitor and/or measure the brake status and/or condition.

Figure 16:
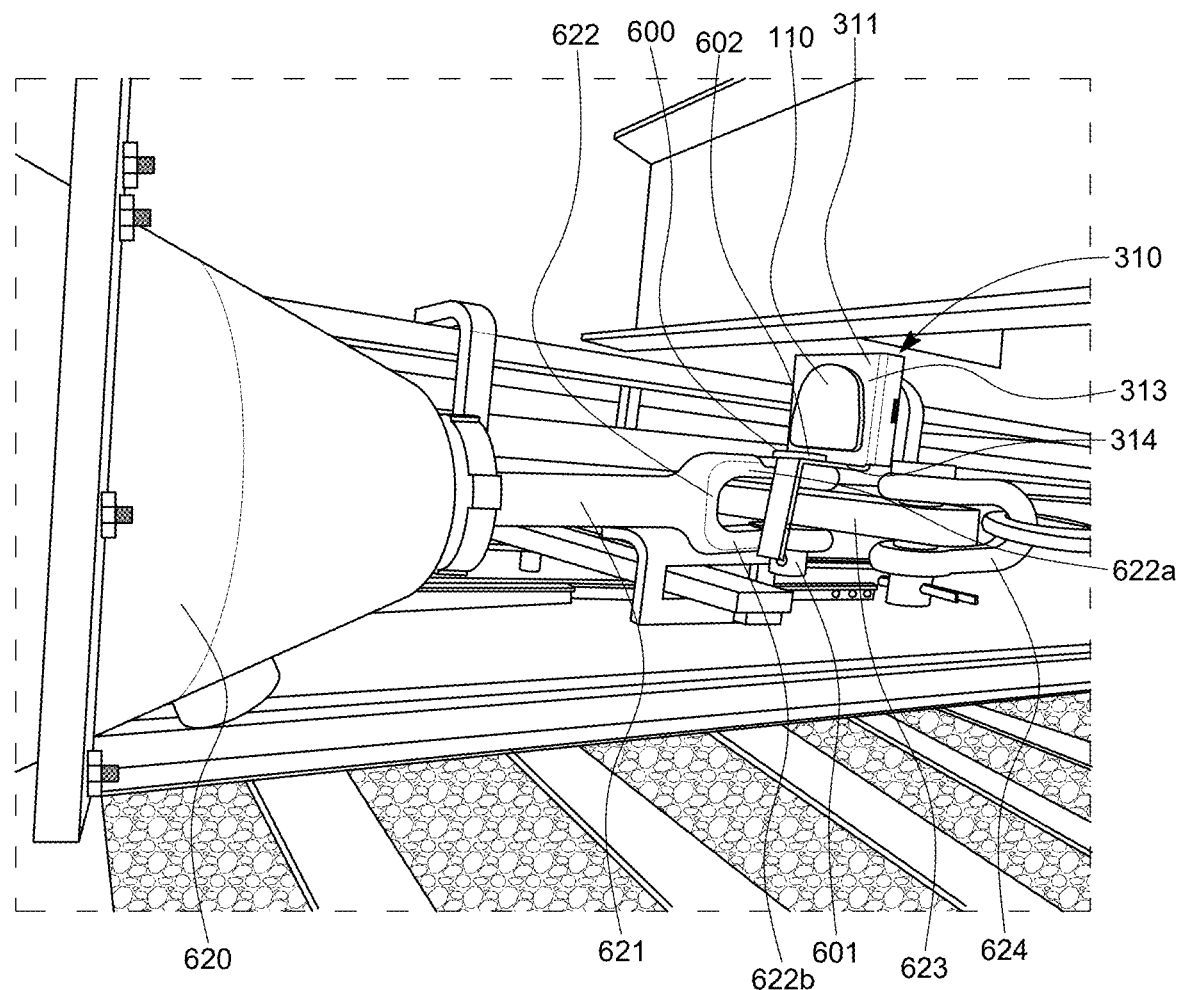
FIG. 16 is an exemplary embodiment of perspective view of a sensor mount shown with a senor and being mounted to a brake assembly of a rail car via a pin connecting a brake piston to a brake lever.
Figure 17:
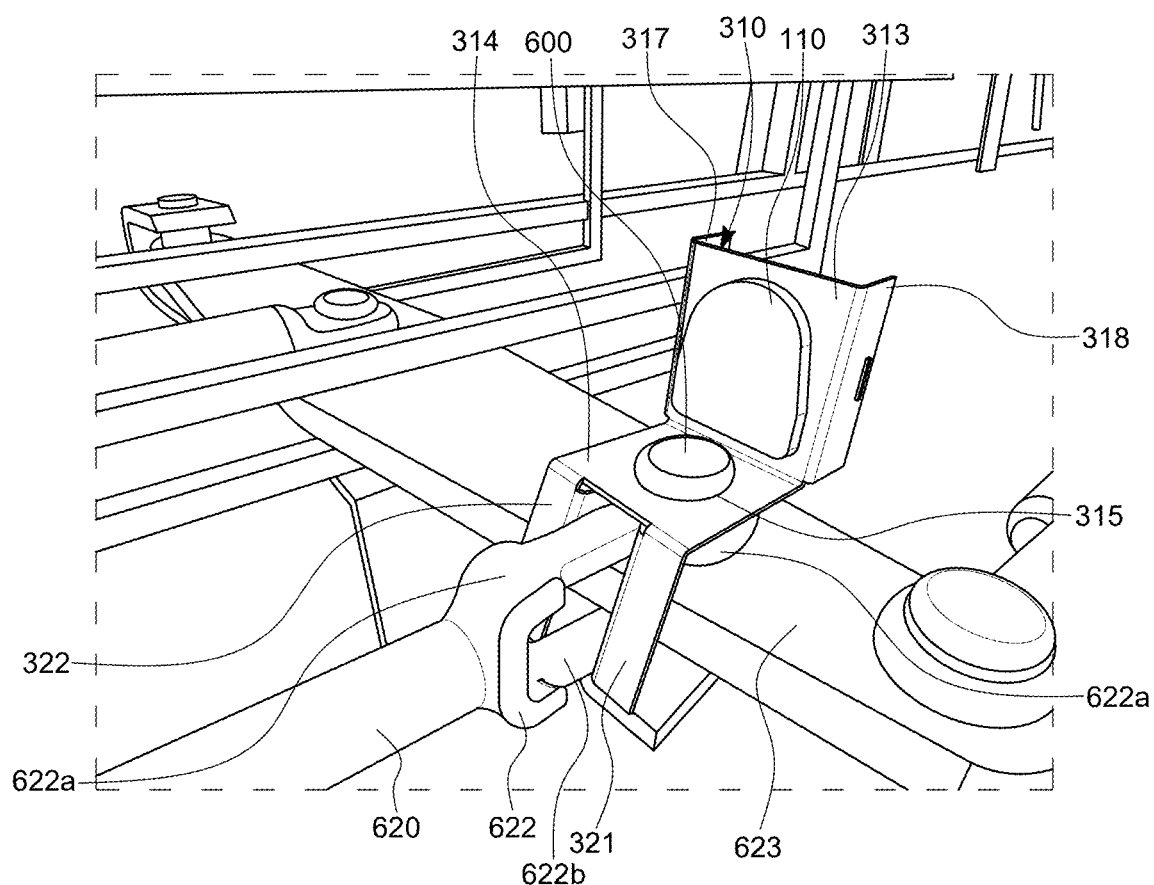
FIG. 17 is a perspective view of the sensor mount and sensor shown in FIG. 16, showing the sensor and sensor mount closer and viewed from a different position.
Figure 18:
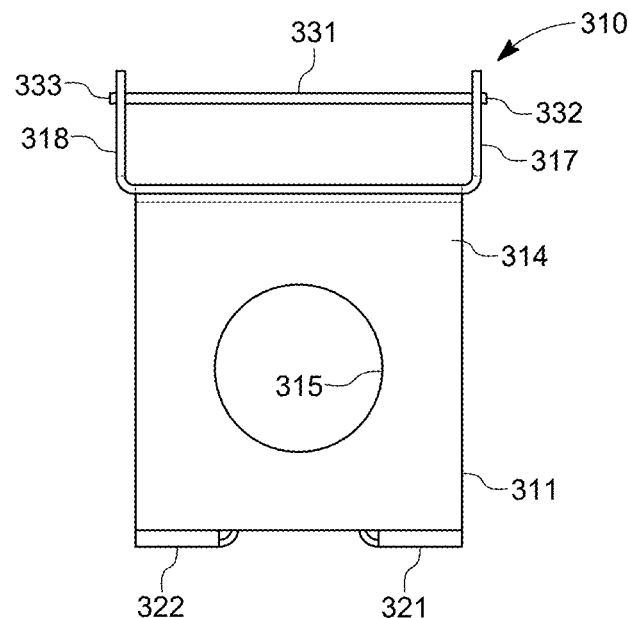
FIG. 18 is a top plan view of the sensor mount of FIG. 16 shown separately from the rail car.
Figure 19:
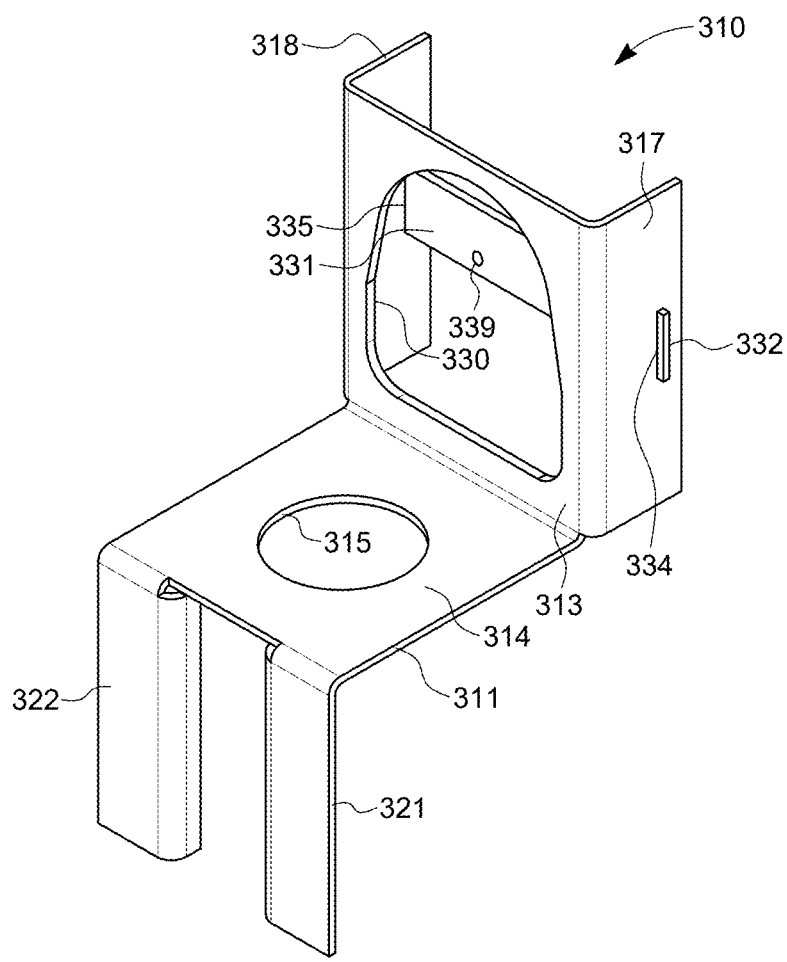
FIG. 19 is a perspective view of the sensor mount of FIG. 16 as viewed from left side of the mount and from above.
Figure 20:
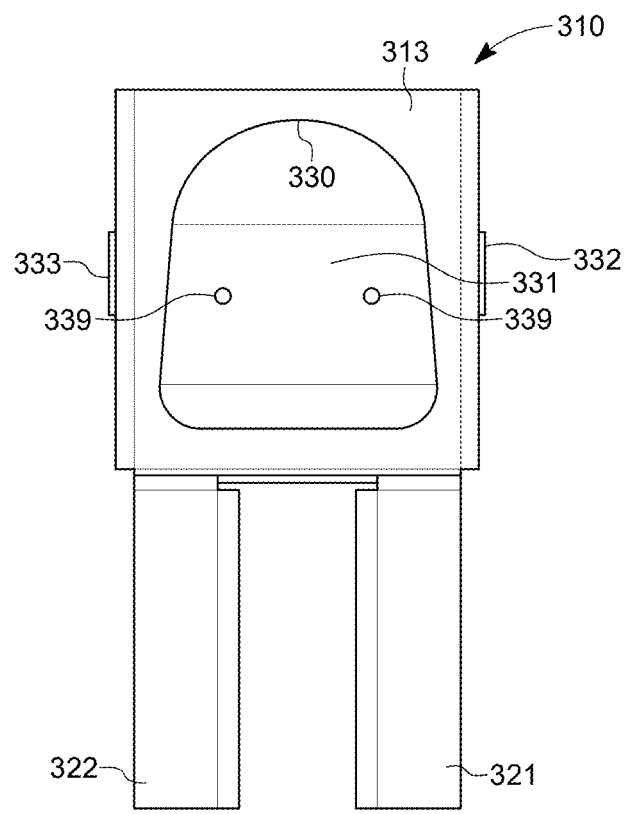
FIG. 20 is a front elevation view of the mount of FIG. 16.
Figure 21:
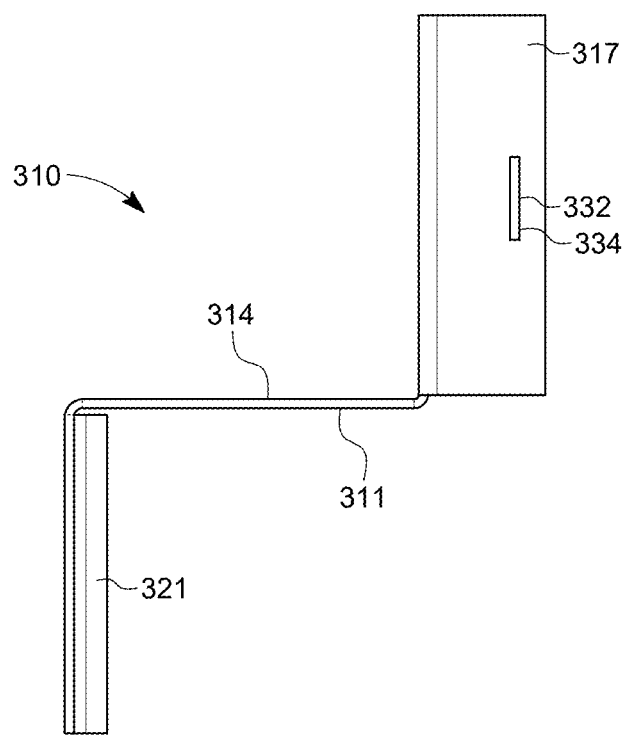
FIG. 21 is a left side elevation view of the mount of FIG. 16.

Referring to FIGS. 16 and 17, a mount or mounting device 310 is shown configured to mount a sensor, such as the sensors 110, 110' to a brake assembly. FIGS. 18-21 show the mounting device 310 separate from the brake assembly and sensor. The mounting device 310 is shown comprising a mount 311 having a body 312 with a mounting flange 313 for mounting the sensor 110, 110' thereon, a connecting portion 314 having an aperture 315 therein which is configured to receive a brake pin 600 therethrough, which mounts the device 310 to the brake assembly via the brake pin 600. The mounting flange 313 has an aperture 330 therein in which the sensor 110 is seated. A pair of flanges or fins 317, 318 are shown adjacent the mounting flange 313, and are provided for stability and to protect the sensor 110. Although not shown, the device 310 may include a cover that forms an enclosure with the flanges 317, 318. The aperture 315 preferably is dimensioned to accommodate the brake pin body or pin shaft 601 therethrough, but is smaller in diameter than the brake pin head 602 (or brake pin head diameter), so that the brake pin head 602 retains the mounting device 310 on the brake assembly. The brake assembly is shown comprising a brake piston 620, which preferably comprises an air brake piston, having a piston rod 621 with a connecting yoke 622 at the end thereof. In the embodiment illustrated, the connecting portion 314 of the device 310 is shown being mounted on the brake assembly and is secured between the pin head 602 and the brake piston yoke 622. The device 310 is shown with the connecting portion 314 situated between the upper yoke arm 622a and the pin head 602.

The pin 600 is shown passing through the first yoke arm 622a, through linkage of the brake assembly, such as a brake lever 623, and through the second yoke 622b. The brake lever 623 is shown connecting to a linkage 624 which may connect to a braking assembly component, such as a hand brake (not shown). The mounting device 310 also includes a pair of arms 321, 322 which stabilize the device 310 against rotational movement to keep the sensor device 110 in proximity to an intended target. The mounting arms 321, 322 are shown disposed on each side of the brake piston rod 621.

FIGS. 18-21 illustrate the mounting device 310 shown separate from the brake assembly, and without the sensor 110 installed. The mounting device 310 is shown having an opening 330 therein for receiving the sensor 110. Preferably, the opening 330 is configured to correspond with the profile of the sensor 110. Where a sensor having a different profile is used, the opening 330 may be configured to accommodate the sensor. Alternatively, the sensor may be mounted over the opening 330 (such as the sensor 110') and attached to the flange 313 and/or mounting bar 331. The mounting bar 331 is shown having tabs 332, 333 at each end, which are received within matingly configured slots 334, 335 disposed in the flanges 317, 318. To facilitate mounting of the sensor, one or more apertures 339 is provided in the mounting bar 331, through which screws or other fasteners may pass to secure the sensor 110, 110' to the mounting device 310. Alternatively, magnets, clips, or other suitable components may be used to secure the sensor 110, 110' to the mounting device 310.

Figure 22:
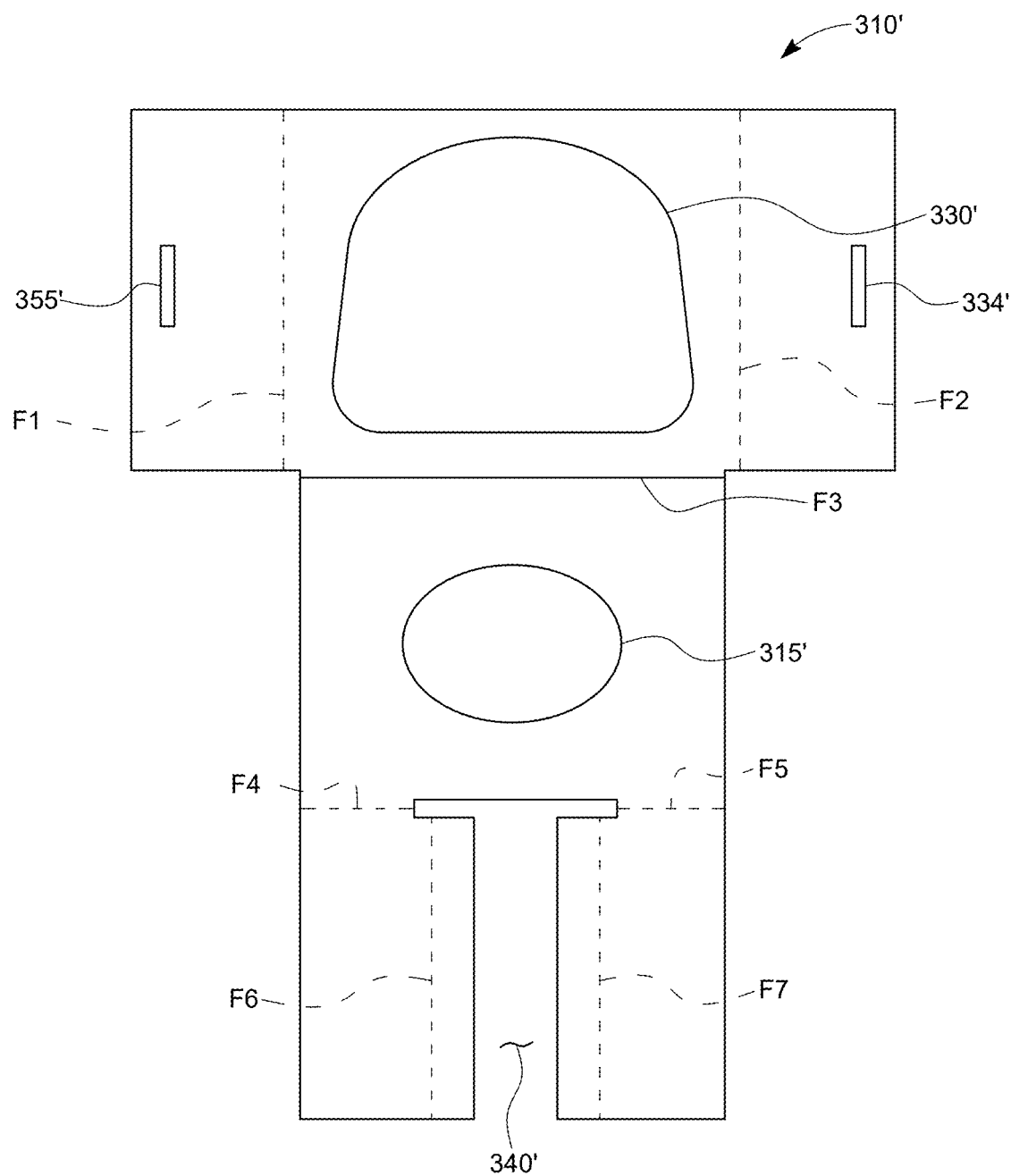
FIG. 22 is an elevation view of a workpiece configured to form the mount of FIG. 16.

The mounting device 310 may be constructed using any method, including injection molding, stamping, welding, or other fabrication process. However, referring to FIG. 22 the mounting device 310 may be constructed according to a preferred method, where a workpiece 310' is cut from a blank using a die, stamping or laser cutting device. The workpiece 310' may be cut from a sheet or roll of material, such as steel or other suitable composition. The workpiece 310' once the cuts are formed, preferably is formed into the mounting device 310 by bending along the fold lines to produce the configuration shown in FIGS. 16-21. For example, the workpiece 310' of FIG. 22 may be folded about 90 degrees along each fold line F1, F2, F3, F4, F5, F6 and F7. The fold lines F4 and F5 may be a continuous segment and may be folded along the same fold line. The workpiece 310' may be formed by stamping, or other method to impart cut outs for the aperture 315', the seating aperture 330' for the sensor 110, and the slots 334', 335'. The perimeter of the workpiece 331', including the arm dividing space 340' may be formed by a suitable cutting method. The edges may be finished as needed, including, for example, by sanding, abrading or polishing to remove any sharp edges, burs or undesired particles.

The system, methods and devices may be used to monitor and determine the status of brake conditions on a railway vehicle. The radar sensor device 110 is configured to obtain measurements of the braking system. Based on the ability of peaks showing up, which in the exemplary implementations depicted, show a plurality of peaks, such as one, two or three peaks, certain determinations of the brake system, ranging from brake on and off, to air brake actuation on and off, to hand brake actuation on and off, and determine how far out from the piston housing the piston has actually traveled.

Figure 23:
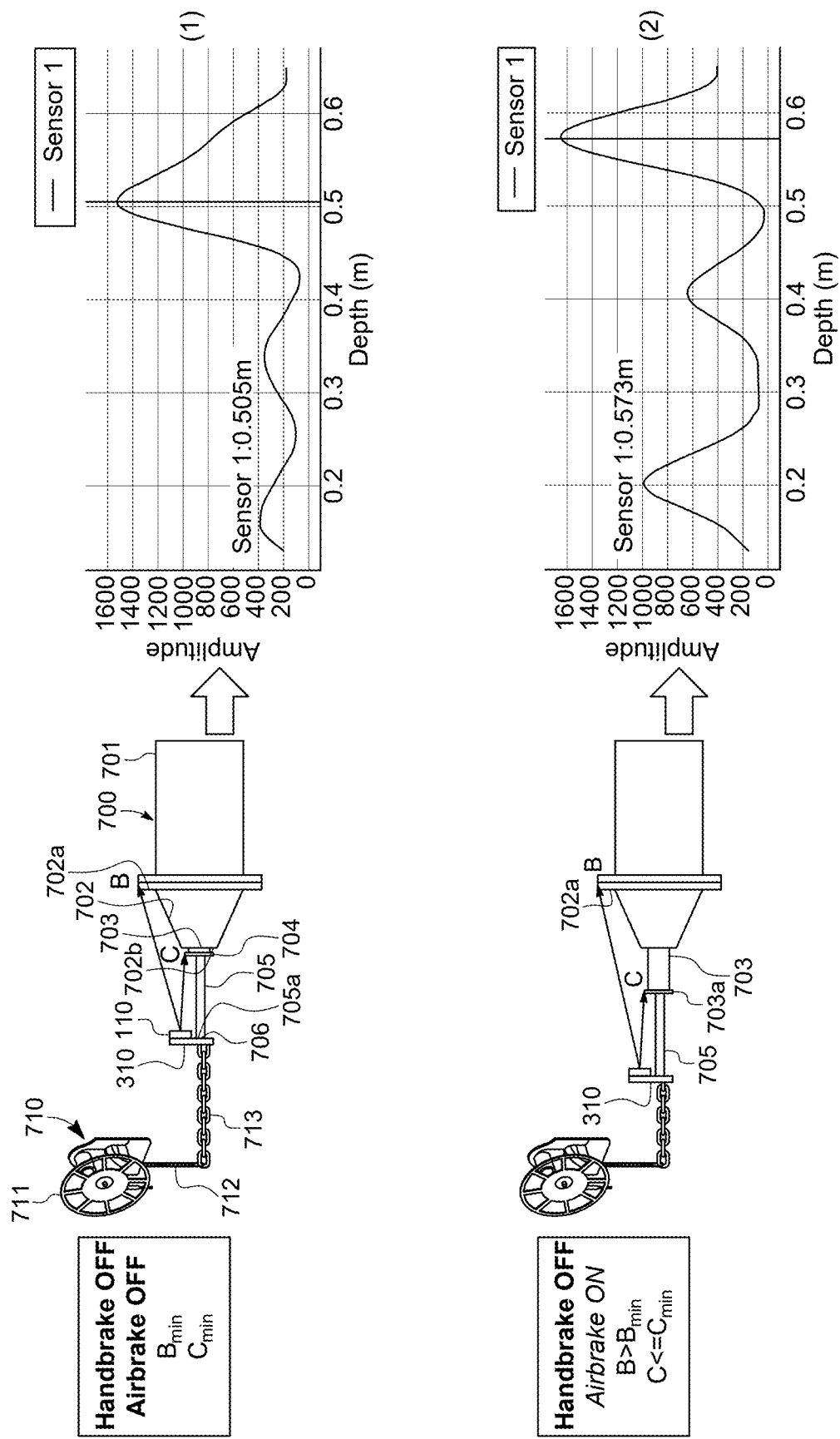
FIG. 23 is a schematic illustration showing a representation of a pneumatic brake and a hand brake in connection with associated graphs representing the conditions depicted.
Figure 23:
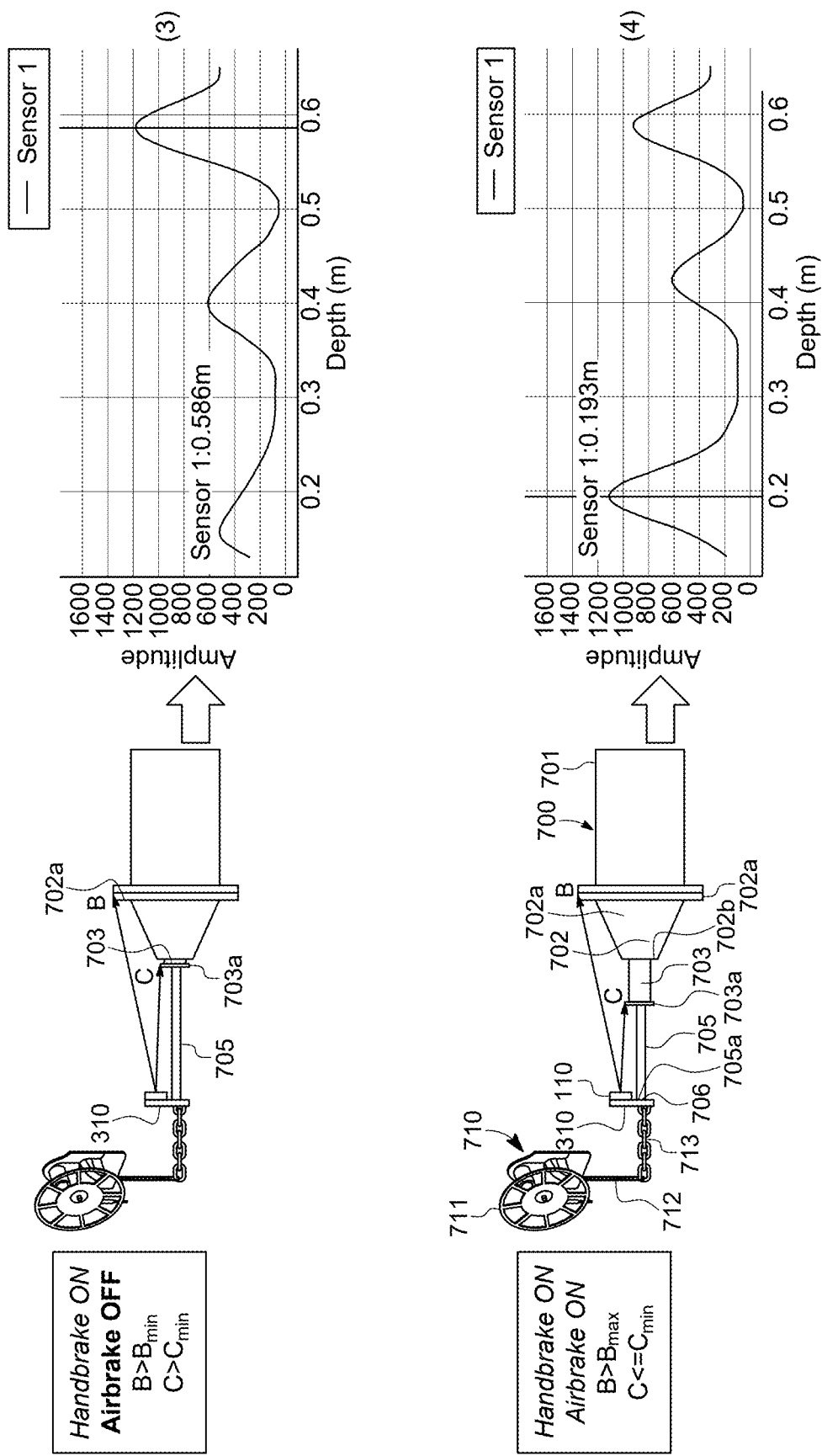

FIG. 23 is a schematic illustration shown depicting a brake piston 700, which is illustrated as a pneumatic or air brake piston, having a cylindrical body portion 701 and a conical shaped body portion 702, an actuating piston 703, which may be a hollow rod having an outer flange 704, and a piston rod 705. The piston rod 705 connects to a brake lever 706 to apply and release a brake. In this schematic depiction, the distal end 705a of the piston rod 705 is shown making a connection with the brake assembly lever or other linkage. The sensor 110, 110' is shown supported on a mount, such as the mounting device 310, or other suitable mount. A hand brake 710 is illustrated, showing a hand brake control 711, a linkage or first chain 712, and a linkage or second chain 713. Although the depiction is shown schematically, other components that are typically provided as part of the hand brake and pneumatic brake assemblies may be provided, including other linkages and connections (for example, see FIGS. 17 and 18). For ease of illustration, the schematic depiction shows a plurality of state determinations for the rail car brake assembly. The arrangement depicted illustrates hand brake and pneumatic brake mechanisms for controlling the engagement and disengagement of the brake. The pneumatic brake control may be an electro-pneumatic brake such as those brake controls widely used in railway vehicles. In the depiction represented in FIG. 23, there is a hand brake 710, represented schematically by the brake actuator or control 711 and linkages 712, 713, and a pneumatic brake assembly (air brake), represented by the piston 700, actuating piston 703 and piston rod 705. The sensor 110 preferably comprises a radar unit that is configured to direct a beam or signal to locations on the brake piston 700. The brake piston cylindrical body portion 701 and conical shaped body portion 702, typically are mounted to the rail car frame and do not move. The actuating piston 703 moves outward from the brake piston body portion, and retracts into the body portion. The sensor radar unit 110 is configured to output a radar signal that is directed to the brake piston 700, and more particularly according to preferred embodiments to a structure of the brake piston 700, such as the flange 702a of the conical body portion 702. The reference distance for the signal between the sensor radar unit 110 and piston 700 is represented by the arrow "B" (the "B" distance"). The reference distance represented by the arrow "C" (the "C" distance) is shown directed to a target that corresponds with the actuating piston 703, and more particularly the flange 703a of the actuating piston 703.

In FIG. 23, the brake status may be determined, and four possible states or conditions are shown (1), (2), (3) and (4), including a first state where both the hand brake and air brake are off (1), a second state where the hand brake is off and the air brake is on (2), a third state where the hand brake is on and the air brake is off (3), and a fourth state where both the hand brake and air brake are on (4). According to preferred embodiments, the air brake and hand brake control the same brake shoes, but provide different means of actuation (engagement and disengagement), so that the hand brake control mechanism may be applied independently of the air brake, and the air brake control mechanism may be applied independently of the hand brake. Regarding the first state or condition (1), where both the hand brake and air brake are off, readings of distance are determined by the radar signal, and identify the "B" distance and the "C" distance as minimum distances, since they represent the positions of the brake piston actuating piston 703 at a location close to (or retracted into) the brake cylinder body, and the piston rod 705 being retracted toward the brake cylinder body (701, 702) while the hand brake is "off" (not applied). In this condition, the hand brake is not applied and therefore does not fix the location of the sensor 110 and distal end 705a of the piston rod 705 at a braking location, but rather, allows the piston rod 705 to be retracted or otherwise moved with the actuating piston 703 (toward or into the brake cylinder body portions 701, 702). The second condition (2) shows the air brake applied to engage the brake, while the hand brake is not applied (though the brake is applied as a result of the air brake actuation). In this depiction, the actuating piston 703 of the air brake assembly is shown traveling out from the cylinder body 701, 702, and moving the piston rod 705 forward of the piston body 701, 702 to engage the brake. In this depiction, the hand brake is off (not actuated). The third state or condition (3) shows a representation of the hand brake being applied ("on") to engage the brake, and the air brake "off" (not applied). The application of the hand brake moves the piston 705 and causes it to travel. In this third state or condition (3), the application of the hand brake typically may result in a piston rod 705 travel location that is more distal from the piston body 701, 702 than the piston travel distance when the air brake is applied (compare with state or condition (2)). In the fourth state or condition (4), the hand brake and air brake are both "on" or actuated to engage the brake. In this condition, the hand brake actuation moved the piston rod 705 away from the piston body 701, 702, so the "B" distance typically is greater than the "B" distance when the air brake is applied and the hand brake is not, such as represented in condition (2). This may be due to the tightening of the hand brake manually.

As depicted in the state or condition (1) where neither brake is applied, the "B" distance and "C" distance are shorter, due to the location of the sensor 110 being closer, respectively, to the flange 702a of the conical portion 702 of the piston, and the flange 703a of the actuating piston 703. A graph showing a plot of amplitude versus distance is provided to illustrate an example of a signal generated and identified with the system, devices and method of the invention. The signal exhibits a strong peak at a distance of just over 0.5 m (0.505 m), representing the "B" distance in condition (1), and a secondary peak appearing at about 0.16 m (the first peak appearing in the graph) is exhibited which represents the "C" distance. The signal processing is carried out and a determination is made that the hand brake and air brake are "off" (so the indication therefore corresponds with the brake being disengaged or not applied). Referring to condition (2), there is a strong signal or peak corresponding to a distance of 0.573 m, representing the "B" distance in condition (2), and a smaller peak appearing at about 0.2 m representing the "C" distance. The signals are processed and correspond with indications that the hand brake is "off", while the air brake is "on" (actuated or engaged). Regarding the graph representation corresponding to condition (3), a strong peak at a distance of about 0.586 m, representing the "B" distance in condition (3), and a secondary peak appearing at about 0.16 m is exhibited which is the first peak on the graph and represents the "C" distance. The signals are processed and correspond with indications that the hand brake is "on" (actuated or engaged), while the air brake is "off" (disengaged or not actuated). The hand brake actuation moves the air brake piston rod 705, while the air brake actuating piston 703 remains retracted within the cylinder body portions (701, 702). The graph corresponding with this state or condition (4) shows a peak at about 0.193 m representing the distance "C", and the peak at about 0.586 m represents the distance "B". The processing of the signals is carried out to make determinations that the hand brake and air brake are engaged or actuated, both "on". The radar signals are reflected from the designated locations being monitored. In the embodiments and implementations, the radar signals are generated within a range and are directed to reach targets that comprise one or more components of the brake assembly of a railway vehicle. The determinations may be displayed, saved, stored, and/or communicated. Reporting may be done to a personal computing device, such as a smart phone. The data and signals are depicted to represent conditions, but a display or other indica may present the data as the condition, such as hand brake "on" hand brake "off", air brake "on", air brake "off", and/or may be color coded for ease of reference, or with symbols or other indicia to correspond with users that speak different languages (where icons or other indicia may be used to indicate the condition).

The system, methods and devices also may be used to determine the brake condition corresponding to the air brake. The system, methods and devices may monitor and measure the piston travel distance (of the actuating piston 703), and whether the distance is in line with regulations or other tolerances or measurements. The measurement determines how far the brake piston (actuating piston 703) travels out of the brake cylinder body (701, 702) and from the cone (e.g., 702b). Referring to FIG. 23, there is a third peak that appears as the middle peak in the graphs. The graph corresponding to condition (2) shows a peak at about 0.41 m, which corresponds with the end of the conical body 702 edge 702b. The signal corresponding with the third or middle appearing peak on the graph represents the distance between the sensor and the front edge of the conical body edge 702b. The "C" distance corresponds with the extension of the actuating piston 703 of the air brake, and the travel distance of the actuating piston 703 may be determined. The actuator rod extension distance from the air brake cylinder (and conical body portion) may be determined. The system, methods and devices may be configured to provide reporting of the information and values, which may be done on demand, periodically, or when a value is out of tolerance, or meeting or failing to meet a predetermined condition.

The signals are represented by the peaks, which represent distances when the radar signal encounters an object, such as a designated location on a brake assembly component, which in the exemplary implementations and embodiments, is a location on the brake cylinder flange 702a and a location on the actuating piston flange 703a. The air brake actuating piston 703 provides an indication when it is moved outward from the brake cylinder. The presence of a peak at a distance or range of distances, as indicated in the graphs shown in FIG. 23, provide an indication of the status of the air brake via the actuating piston 703. The system, method and devices may determine how far the brake is applied as well as whether the brake is applied (hand brake and/or air brake).

According to embodiments of the devices and system and implementations of the method, the condition where the hand brake is on and the air brake is not on may be determined based on the piston rod travel. As shown in FIG. 23, condition (2) shows the air brake on and hand brake off, while condition (3) shows the air brake off and hand brake on. The piston rod (705) travel is greater when the hand brake is applied and the air brake is off (condition (3)), than it is when the air brake is on and the hand brake is off (condition (2)). The largest peak representing the "B" distance is slightly greater in condition (3) than in condition (2). For example, the piston rod (705) travel difference may be a measurable quantity, such as for example, about 10 mm, which the system determines and detects to provide an indication that the state or condition is (2) versus (3).

The measurements also may be generated in association with environmental conditions, such as, for example, temperature, humidity, elevation, and other variables that may impact the braking conditions or measurements being made. In addition, the systems, methods and devices may be adapted for different car types. The radar processing circuitry is programmed to determine representative peaks corresponding to the brake assembly components. In some instances, the devices may be programmed to exclude signal interference from surrounding structures, such as, for example, struts and other components of a rail car which may reflect and potentially interfere. The system, methods and devices may be configured to implement confidences in the readings, in the event there are interfering structures or production of interfering signals or peaks. The system, methods and devices preferably are configured to expect signal peaks as a result of the reflections of the signal off of surfaces or structures, to appear in certain ranges. Ranges for the peaks, for example, may be pre-designated where to expect the far peak and close peak, and there is not an expectation of a far peak overlapping with a close peak. The system provides reliability and resolution of the signals, to provide discrete expression and exhibition of the signals and the represented peaks. The ranges may be adjusted for differences between braking system components, rail car structures and components (including components not part of the braking system, which may otherwise impart interferences). The sensor preferably is configured with a signal focusing mechanism which may comprise a lens, antenna or other component that can focus the signal to the range and parameters desired.

Preferably the radar circuitry is configured to ignore reflections beyond the brake cone, or before the closest measurement to the radar sensor, such as for example, in front of where the air brake cylinder actuating piston would extend to (for example, such as beyond the distal most location of the collar 703a, e.g., when the air brake is applied). The range of the radar signal and/or processing preferably is set to encompass the desired reading locations. According to preferred embodiments and implementations, the radar processing circuitry is configured to ignore anything beyond the brake cylinder (or brake cylinder flange) and before the location of the maximum extension from the brake cylinder of the actuation piston. Activity occurring beyond the desired location parameters therefore can be filtered out or ignored (based on settings and/or programming). According to some preferred embodiments, the range of monitoring may be from about 650 to 200 mm.

Figure 24:
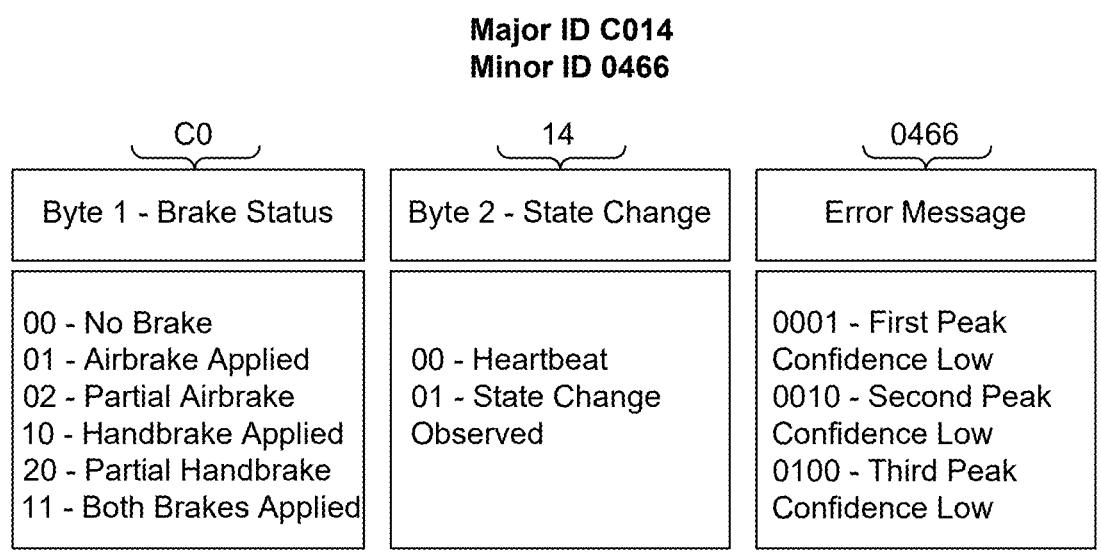
FIG. 24 is an exemplary depiction of signal conditions and associated beacons for providing, displaying or communicating the information about the monitored brake.

The radar unit preferably generates a radar signal, which may be any suitable radar signal that can be monitored and measured to provide a determination of the location or locations of the targets, such as the brake assembly components. According to some embodiments, pulse coherent radar is one example of a type of radar that may be used in conjunction with the invention, although other types of radar may be used. Embodiments of the devices may produce continuous radar signaling interpreting the reflections, or may provide one radar shot, and then interpret the radar shot, or a plurality of separate radar shots which may be periodic or when a measurement is desired. The radar processing preferably includes using the magnitude of the reflection, and making determinations of the occurrence of the reflections, and identifying the locations of the brake components of interest. These identifications allow determinations to be made as to the brake status, and which brake actuator, e.g., hand brake and/or air brake, or neither, is/are engaged or disengaged (on or off). For example, FIG. 24 illustrates an exemplary depiction of signal processing showing variations for conditions and reporting states, and indications for state changes, as well as confidence levels in conjunction with potential error messages. The system may therefore be configured not only to report but to provide reliability indications based on the signal processing and peak strength to determine a confidence level for a determined or reported measurement. An identification may be used to provide the location or identity of the brake system or rail car on which the brake system is located, as well as which brake location on the rail car (front, rear, etc.) to allow brake monitoring and measurements to be associated with the rail car.

Figure 25:
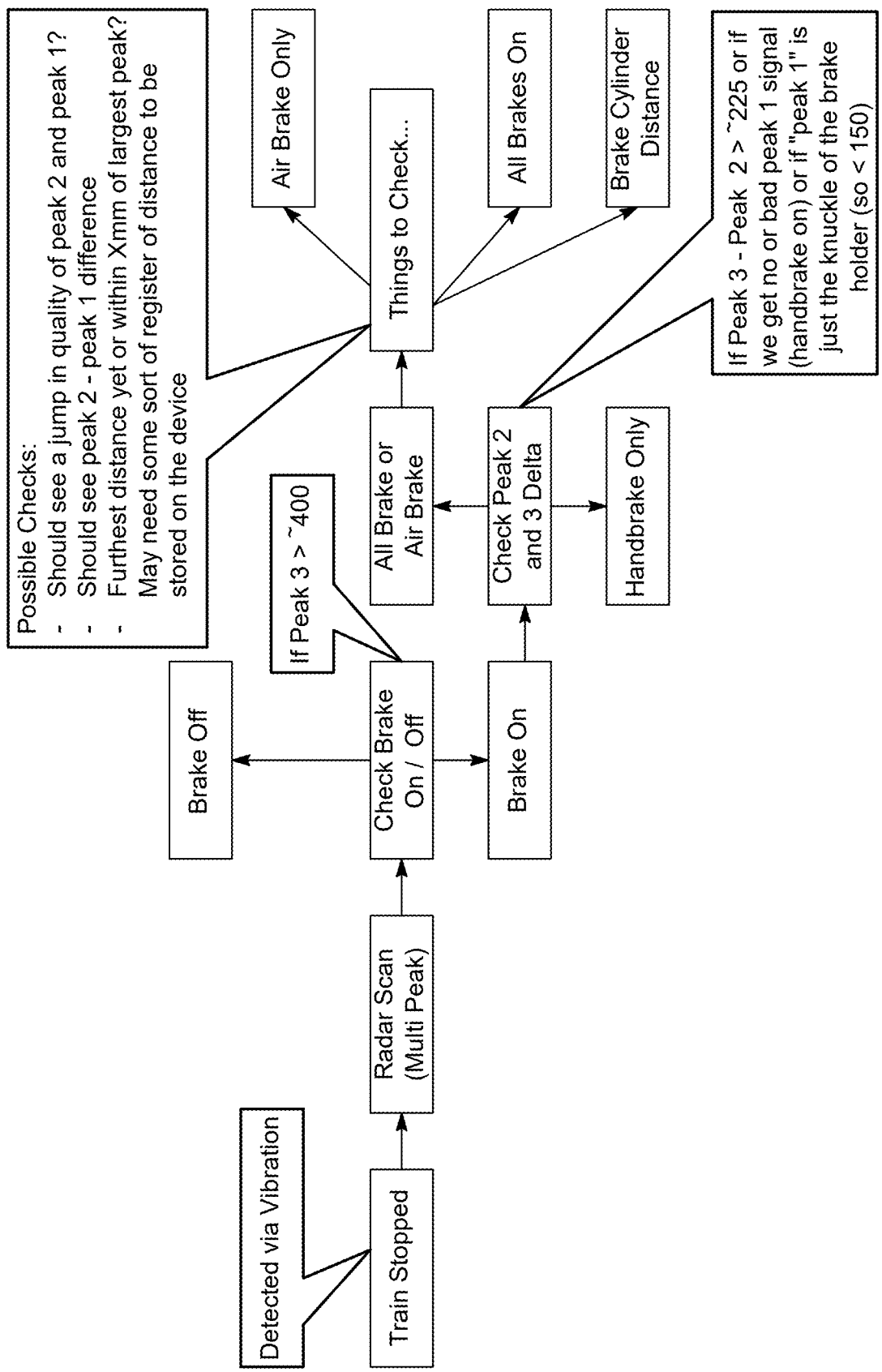
FIG. 25 is a flow diagram illustrating an exemplary implementation of logic determinations for a system, methods and devices for monitoring brake status and brake health conditions.
Figure 26:
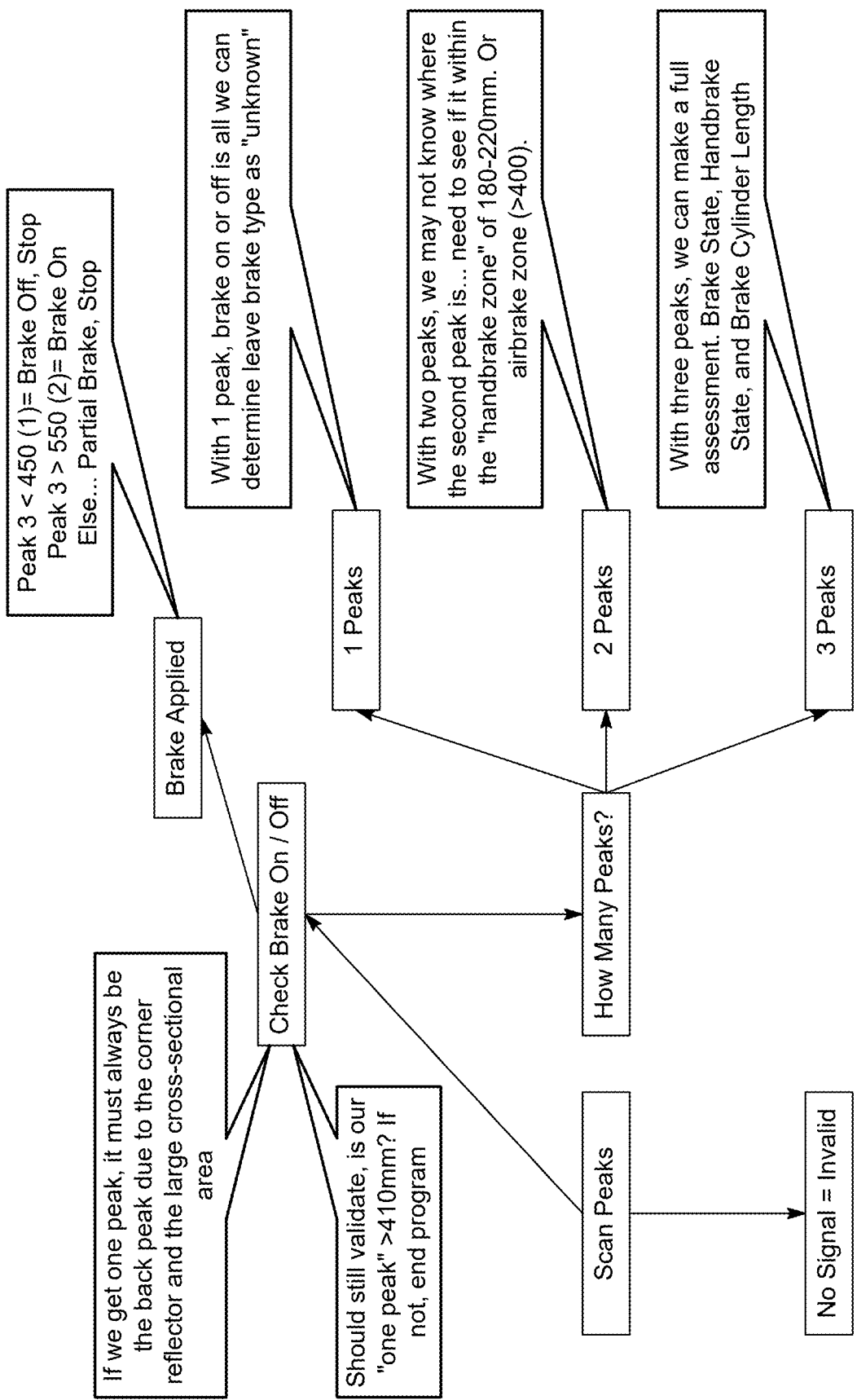
FIG. 26 is another flow diagram illustrating an exemplary implementation of logic determinations for a system, methods and devices for monitoring brake status and brake health conditions.

The system, methods and devices may include or be implemented with one or more associated sensors, such as a GPS sensor or accelerometer. These additional sensors may be utilized in conjunction with the wireless brake monitoring devices, to provide a trigger to measure or not measure a condition or state, or to commence a measurement action. For example, the monitoring or measurement status may correspond with a change in motion of a rail car being monitored, such as indications from an accelerometer or vibration sensor, or other sensor, that the train has stopped, or that train has commenced motion. An exemplary depiction of a brake flow diagram is shown in FIG. 25 in accordance with the method, system and devices. The flow diagram represented in FIG. 25 illustrates exemplary implementations of logic determinations for the system, methods and devices for monitoring brake status and brake health conditions. The train stopping is a detected event, which preferably may be ascertained with one or more of the sensors, including the sensor 110, or associated sensors or circuitry. Scanning is then carried out using the radar signals of the sensor 110 to make determinations whether the brake is on or off. If the brake is on, then further information is determined to ascertain the brake condition, and in particular, whether the hand brake is on, the air brake is on, or both the hand brake and air brake are on. The brake cylinder distance also may be determined (such as when the air brake is applied), to monitor the brake health and any required regulatory parameters. The shaded text in the rectangular bubbles represent some exemplary conditions and parameters that can be used to provide determinations, and are shown for reference. Referring to FIG. 26, another flow diagram is shown illustrating an exemplary implementation of logic determinations for the system, methods and devices for monitoring brake status and brake health conditions. The flow diagram may represent programming that is implemented in the circuitry or other components of the sensor or associated devices, that provide determinations of the brake condition status based on the radar signals. The system may intelligently identify patterns of brake conditions associated with the peaks, as well as peaks strength, and distance between peaks, and peak distances. These measurements may also be used to determine confidence levels, as well as reliability of the information. According to some embodiments, the system may be configured to intelligently redefine condition levels based on the measurements and information from the brake component target positions and their associated brake status, which the system and devices can implement and use to apply to brake systems that may have different geometries, or brake component locations or sizing.

The radar field may be adjusted so that readings are confined to an area of interest, such as over a range of where the expected monitored components are located. The sensor 110 may be configured with adjustable circuitry to focus or limit the radar travel, as well as over what range the signals are processed or ignored. For example, the radar signal or beam may be shaped or otherwise focused with a lens or antenna. The focusing component, such as the lens or antenna, may be provided as part of the sensor 110 and radar circuitry. For example, according to some embodiments, the lens is used to provide a field that focuses the radar signal in the locations where the target brake assembly components of interest are located, such as the brake cylinder flange (see e.g., 702a) and actuating piston (703). The signal may be processed to provide reliability and reduce or minimize interferences. For example, the signal may be filtered, such as, for example with a low pass filter.

The inventive systems, methods and devices, according to preferred embodiments, are configured to include or operate in conjunction with other components. The inventive systems, methods and devices may be configured as a monitoring system which includes components that can be quickly and easily mounted to railway vehicles, such as a freight car, or other rail car types. The systems, methods and devices also may be configured for use with locomotives. The methods, systems and devices also are configured to wirelessly transmit data, which may be done locally to a device, or through a network, or remote networks. The wireless data may be transmitted to one or more suitable devices, including to a smartphone or tablet computer, mobile gateway on the railcar or to a fixed gateway as part of a yard or train network. According to preferred embodiments, the monitoring devices is designed for permanent installation on a railcar and are configured to operate for extensive durations of time, without the need for external power. The capability to provide the monitoring functions and operations over a great duration, such as for many years, is not a trivial solution, and further contributes to the features of the invention.

The air brake state indication obtained with the inventive system, methods and devices may be used for pre-trip brake inspections. The present system, method and devices automate ascertaining the status of the air brake. Preferably, each rail car brake assembly may be fitted with the present system and devices so that indications of brake status may be automatically generated, identified and/or reported. The sensors also are provided with unique identifiers or are otherwise assigned to rail cars so the identity of the rail car may be provided with its corresponding brake status. A collective status of rail cars forming a train also may be provided by the system. For example, where the brake status of all cars is (or is required to be) a single status, such as for example, engaged, then that can be reported. If a single car of a train of cars is disengaged while other cars of a train are engaged, then this can be generated and provided as an alert. Conversely, where the brakes are to be disengaged, then the system, methods and devices can confirm the condition for the cars in a train. Other conditions that the brake monitoring devices can provide also can be generated and alerts can be provided.

According to preferred embodiments, the sensor comprises a radar unit, and the radar unit is configured to direct its signals over a beam width that encompasses the locations of measurement or targets. According to a preferred embodiment and implementation, the sensor broadcasts a beam that encompasses the targets, which in the exemplary illustrations are the target at the front flange 702a of the brake cylinder, and the flange 703a of the actuating piston 703. According to some preferred embodiments, a lens is used, which may be an antenna or other beam or signal focuser, that is designed to direct the beam to the target locations (so that the beam will encompass the locations and anticipated locations of the targets), which in the exemplary illustration are the locations represented by the arrows "B" and "C". According to some alternate embodiments, the sensor unit may be configured to direct the radar signal to provide a suitable range or distance, and/or location, to reach and identify the target.

According to preferred embodiments and implementations, the measurements using the sensors and radar signals, preferably include designation of at least one stationary target or element, and of at least one non-stationary target or element. Multiple measurements of non-stationary targets may be used to make determinations of multiple moving components of a brake system, and/or also may be sued to provide reliability checks. In some implementations and embodiments, multiple non-stationary targets or elements are used to make determinations of different brake and brake component conditions. According to preferred embodiments and implementations, the target or element comprises a location on the rail car existing structures or components, and preferably locations on the brake system components, such as the air brake components. The relationship however takes into account variables, since the application of a hand brake can produce differences in the locations of one or more components of the pneumatic brake (or air brake). For example, the piston rod 705 may be at different locations relative to the brake cylinder body (701, 702) even when the hand brake is off (see, e.g., FIG. 23, states (1) and (2)). The present system, methods and devices, are configured to implement determinations based on the setting of the hand brake and air brake for the rail car being monitored and measured. According to some implementations, machine learning is applied and the system, method and devices provide smart implementations by identifying correspondences for minimum distance values based on the status of the hand brake and the air brake when they are off (disengaged or released). An example of this depiction is shown in FIG. 23. The system, methods and devices also may be used to determine brake health, where the distances change due to brake wear, wear of one or more linkages, or other condition being monitored relating to the braking assembly or components thereof. The travel distances, as monitored and measured by the "B" and "C" distances, may indicate a tolerance by way of a change in maximum or minimum values to one or more subsequent maximum or minimum values, or other values including the relative differences between one or more values and the determined maximum and/or minimum values.

The system and monitoring devices preferably include circuitry configured to detect and process radar signals from the sensor radar device 110, and to operate the sensor 110 to broadcast radar signals, and to process the reflected signals to determine the brake condition. The device circuitry of the sensor 110 preferably includes programming with instructions for carrying out the regulation of the radar unit and signal frequency modes, as well as for processing the signals from the radar unit. This may be done with one or more other associated sensors if desired, such as where brake monitoring is to be done upon an event or condition that is also being monitored. The circuitry is configured with programming to enable the processor to process the signals and determine the status of the brake, such as the hand brake and air brake, and determine which is or is not applied. According to some preferred embodiments, the devices, such as the sensor 110 shown and described herein, include circuitry powered by a power supply, such as a battery or other suitable power source. The circuitry includes a radar signal generator, and processing components for processing the radar signals. The circuitry and device 110 also may include one or more communications components for communicating the information to a remote component, and according to some embodiments, to receive communications from a remote component. Examples of the device circuitry may include a radar signal generator or transmitter and receiver, transceiver and one or more antennas, and a lens or other component to focus the signal to an area or detection zone where the brake components are or will be located during the monitoring or measurement. The sensor device components may be in an integrated circuit or chip that includes the components needed to process and emit the radar beam and to detect the reflected beam, as well as handle other operations of the radar processing or adjustment. The sensor components may include a radar signal generator and antennas as well as software or other instructions for processing the signals and communicating them to a remote component. For example, a microcontroller or microprocessor may be provided as part of the circuitry. Software including embedded logic, as well as microprocessors, microcontrollers, microcircuits, containing instructions for instructing a microprocessor or processor to process, store and/or communicate the radar signals, may be employed to comprise the circuitry within the unit.

Optionally, according to some alternate embodiments and implementations, a reflector or other item may be provided at a distance or on a measuring surface to provide a point for a target. For example, a reflector or target may be affixed at the location of the brake cone flange 702a to provide a target location (as an alternative to the target comprising the flange 702a itself). According to preferred embodiments and implementations, the system, methods and devices are designed to use existing brake assembly components to serve as the targets (without the application of separate target reflectors) for the monitoring and measurements carried out to identify conditions of a brake (on or off), as well as potential wear or health issues of the brake components based on travel of the piston and distances identified for the hand brake movement and piston travel. Although illustrated with a brake cylinder and associated linkages, the system may be implemented in connection with other linkages and components that apply and release the brakes. Typically, the brake lever applies a force or forces to friction elements, such as brake shoes and/or brake pads, which engage a wheel structure, such as a wheel surface, to abate or stop movement. Although the brake has been referred to, the linkages and applications of the brake may involve application of a plurality of brake shoes to brake a plurality of wheels. The lever or levers actuated by the hand brake and/or air brake may be connected or linked with other levers or linkages that apply a plurality of brake components to the wheel, wheels or wheel sets (which actuate the brake shoes).

The present invention provides a monitoring solution for automating the pre-trip brake inspection process. The components are designed for universal applications to existing brake systems, including air brakes, truck mounted brakes, and hand brakes to provide a cost-effective universal application for reliable, long life operation. These and other features of the invention are provided. Although a number of features are discussed herein, a single feature may be combined with one or more other features. For example, the wireless radar devices may be constructed for use on existing systems, and may be mounted thereto, while according to some embodiments, the wireless brake monitoring devices may be provided in conjunction with or include mounting means or mechanisms for installation. Brake pins may be provided and configured to carry the wireless brake monitoring devices, and some brake pins also are provided in accordance with the inventions herein. Targets of the wireless sensor preferably include metal surfaces that the radar beam projected from the sensor device will hit. The radar sensor unit preferably is provided within the device housing and may produce a narrow or focused beam directed to the target. The radar preferably is controlled to hit the target and preferably detects close range distances within the brake system or target surfaces. The radar unit is shown according to some preferred embodiments situated on a brake assembly component, and directed to detect movement or relative distances between one or more other brake assembly components, to ascertain conditions or states of a brake as well as distances and movement of the brake assembly components being detected and measured.

According to embodiments of the invention the wireless brake sensor preferably includes a radar unit, which may comprise suitable circuitry and components for propagating a radar beam of a desired length and width and suitable energy to reflect off of an intended target. A self-contained radar module preferably is provided, and is configured to communicate readings for the brake application being monitored.

The radar unit may include a transmitter that generates a desired RF waveform at a suitable or designated power level. The RF power may be derived from any suitable source and preferably one that will reside within the housing of the wireless sensor. Some examples of RF generators include power oscillators, magnetrons, or interaction oscillators, though solid-state amplifiers may be utilized. Radar circuitry may include a modulator, transmitter and duplexer, and an antenna connected to the circuitry to receive and communicate signals, such a signals directed to a target, as well as to receive signals reflected off the target. The antenna also is connected to provide the received signals to a suitable receiver within the circuitry. The signals transmitted and echoes received are processed to determine the proximity of the target or brake component to provide an indication. The indication is compared with the position or level that may be predetermined to constitute an acceptable tolerance level or an indication that the brake is out of range, and is deemed to warrant a further inspection. According to some embodiments, the radar system provides information that identifies whether the brake is in an actuated position or condition, where it is applied, versus a condition or position where the brake is released (not applied).

The radar used is a suitable radar for the distance and components being targeted and monitored, and preferably comprises a low power low energy using solid-state or embedded circuitry, powered by a low discharge long-life battery, such as for example, a lithium thionyl chloride type battery.

The radar system may be a simple pulse generated system, an unmodulated continuous wave (CW) generating system, or other system suitable for providing a moving target such as the brake position or its movement via one or more of the brake system components (such as, for example, a brake piston, or brake arm). Waves generated by the radar unit may be modulated. The wireless brake monitoring sensor unit preferably includes one or more radar antennae or transceivers, which preferably couple RF energy from the radar transmission line into the propagation medium and vice versa. One or more antennas may provide beam directivity and gain for both transmission and reception of electromagnetic energy. The radar unit also includes a radar receiver, so in addition to broadcasting or propagating a beam directed from the antenna, to receive the signals which preferably include those returned by the target object (which may be received through the same antenna or another antenna).

According to some embodiments, the radar unit preferably includes circuitry, which may be on a microprocessor, microcontroller, or solid-state or other embedded logic, that is configured to amplify weak target signals to a level that may be utilized for processing to determine the brake condition or position.

The embodiments illustrated preferably may be used in conjunction with the brake pin of a brake system. The installation of the wireless radar sensor devices shown and described herein are self-locating to provide a consistent orientation of the pin. The mounting structure, such as the brake pin and mounting device configurations shown herein, include a stabilizing component for alignment, such as the arms, which provide a consistent positioning of the sensor device when the brake pin or mounting device carrying the sensor device is installed on the brake system. The arms preferably provide guides to limit movement, such as rotational movement of the pin and/or sensor outside of a predetermined tolerance range (so that the sensor remains directed to the intended target and brake components being monitored are within the signal range or zone).

The wireless sensors shown and described herein preferably include a radar unit (e.g., circuitry) that is tuned or otherwise configured to project a radar beam during a brake monitoring event. Preferably, a bake monitoring event may be a suitable time when the brake condition is desired to be monitored. The system, may be configured with software and/or programming to conduct the brake monitoring automatically at automatic or prescheduled time intervals, or may be actuated by an operator to initiate the monitoring. The monitoring by autonomous mode, or operator initiation, may be employed to monitor a single car, a specific car, a plurality of cars, or an entire train of cars. The railway vehicles being monitored, such as, for example, freight cars, preferably are identified by the location of the wireless monitoring device, with each device having a unique identifier (such as a signal identification or other suitable mechanism) so that the reading or readings are identified to correspond with a specific car or location of the brake on the car, or the type of brake of the car (e.g., hand brake or the car's main brake system).

These and other advantages are provided by the invention and the exemplary embodiments disclosed herein. Although specific features may be disclosed in one embodiment, the features may be used together.

What is claimed is:

1. A system for determining a state or condition of a railway vehicle brake of a railway vehicle brake assembly that has at least one component that moves to engage or disengage the railway vehicle brake, comprising:
    a) a wireless brake monitoring sensor comprising a radar unit contained within a housing and being mountable to a railway vehicle;
    b) a power supply contained within the housing;
    c) wherein the radar unit is configured to project a radar beam during a brake monitoring event;
    d) wherein the sensor includes circuitry with one or more processing components to process signals from the radar unit that determine the brake condition, including signals reflected off of one or more targets;
    e) the radar unit projection being directed at a first target and a second target, wherein the first target comprises a static target, and wherein the second target comprises a movable target, wherein the movable target comprises a location on the at least one component of the railway vehicle brake assembly that moves to engage or disengage the railway vehicle brake;
    f) wherein the monitoring sensor is configured to identify signal responses that correspond with the location of the static target, and wherein the monitoring sensor is configured to identify signal responses that correspond with the location of the movable target; and
    g) wherein the state of the brake in the railway vehicle, is whether the brake is on or off.

2. The system of claim 1, wherein the state of the brake in the railway vehicle is whether the brake is engaged or disengaged by a pneumatic brake actuator.

3. The system of claim 2, wherein the pneumatic actuator comprises an air brake assembly.

4. The system of claim 1, wherein the state of the brake in the railway vehicle is whether the brake is engaged or disengaged by a manual actuator.

5. The system of claim 4, wherein the manual actuator comprises a hand brake assembly.

6. The system of claim 1, wherein the state of the brake in the railway vehicle is whether the brake is engaged or disengaged by a manual actuator, and whether the brake is engaged or disengaged by a pneumatic actuator, wherein the state of the pneumatically actuated brake is on or off, on being engaged and off being disengaged, and wherein the state of the manually actuated brake is on or off, on being engaged and off being disengaged.

7. The system of claim 1, including a railway vehicle brake assembly comprising a pneumatic brake, a pneumatic cylinder with an associated actuator and a piston, the piston being movable to pneumatically engage and disengage the brake.

8. The system of claim 1, wherein the brake assembly further includes a hand brake actuator and linkage for applying the brake manually, the hand brake actuator being maneuverable to manually engage and disengage the brake.

9. The system of claim 7, wherein the first target comprises a location on the pneumatic cylinder, and wherein the movable target comprises a location on the piston.

10. The system of claim 9, wherein the brake assembly further includes a hand brake actuator and linkage for applying the brake manually, the hand brake actuator being maneuverable to manually engage and disengage the brake.

11. The system of claim 10, wherein the state of the brake in the railway vehicle is whether the brake is on or off, and further includes an indication of whether or not the pneumatic brake actuator is applied to engage the brake, and whether or not the hand brake is applied to engage the brake.

12. The system of claim 10, wherein the state of the brake in the railway vehicle is whether the brake is on or off, and further includes whether pneumatic brake is on or off, and whether the hand brake is on or off.

13. The system of claim 9, wherein the pneumatic cylinder has a flange, and wherein the first target which is a non-movable target comprises a location on the pneumatic cylinder flange.

14. The system of claim 13, wherein the piston has a flange or collar, and wherein the movable target comprises a location on the piston flange or collar.

15. The system of claim 9, wherein the monitoring device is configured to determine the distance of piston travel relative to the pneumatic cylinder.

16. The system of claim 1, wherein the sensor includes circuitry configured to control the radar unit to produce signals to detect the one or more targets comprising one or more components of the railway vehicle brake system that are within the range of the radar signals; wherein the circuitry includes a processor and one or more programmable components, programmed with instructions for:

(i) actuating the radar unit to produce a radar signal,
(ii) broadcasting the radar signal over a detection range,
(iii) processing the radar signal for detections to determine whether an object is within the detection range;
(iv) measuring the distance and changes in distance of the object within the detection range; and
(v) detecting movement of the one or more brake components within the detection range to determine the brake condition.

17. The system of claim 1, including a mount, and wherein the wireless brake monitoring sensor is attached to the mount, and wherein the mount is configured to install on the brake assembly.

18. The system of claim 17, wherein the mount includes a surface with an aperture therein, and wherein the mount includes an adjacent surface comprising a flange, and wherein the wireless brake monitoring sensor is attached to the flange.

19. The system of claim 18, wherein the mount includes a pair of arms protruding downward from the surface having the aperture, the arms being spaced apart to define a space therebetween.

20. A method for determining a condition of a railway vehicle brake of a railway vehicle brake assembly that has at least one component that moves to engage or disengage the railway vehicle brake, comprising:
   a) determining with a wireless brake monitoring sensor comprising a radar unit a distance between said wireless brake monitoring sensor and a first target, wherein the first target is a location on the surface or structure of a railway vehicle brake assembly;
   b) wherein the wireless brake monitoring sensor is mounted to generate signals that identify the positions of one or more brake assembly components, including at least the location on the surface or structure of a railway vehicle brake assembly that is the first target;
   c) monitoring the signals generated from the wireless brake monitoring sensor, and determining a change in the signals; and associating the determined signal change with a corresponding change in the surface or structure of a railway vehicle brake assembly that is the first target to identify a change in the position of the least one component that moves to engage or disengage the railway vehicle brake;
   d) determining a state of the at least one component that moves to engage or disengage the railway vehicle brake based on the corresponding signal change from the surface or structure of a railway vehicle brake assembly that is the first target determined from the signal change in c);
   e) the radar unit projecting a beam being directed at the first target and a second target, wherein the first target comprises a static target, and wherein the second target comprises a movable target, wherein the movable target comprises a location on the at least one component of the railway vehicle brake assembly that moves to engage or disengage the railway vehicle brake;
   f) wherein the monitoring sensor is configured to identify signal responses that correspond with the location of the static target, and wherein the monitoring sensor is configured to identify signal responses that correspond with the location of the movable target; and
   g) wherein the state of the brake in the railway vehicle, is whether the brake is on or off.

21. The method of claim 20, wherein the monitoring sensor is carried on the least one component that moves to engage or disengage the railway vehicle brake.

22. The method of claim 21, wherein the railway vehicle brake assembly that has at least one other component that does not move to engage or disengage the railway vehicle brake, and wherein the monitoring sensor is carried on the least one other component that does not move to engage or disengage the railway vehicle brake, and wherein the monitoring sensor is configured to determine the state of the brake by determining the movement of the at least one component that moves to engage or disengage the railway vehicle brake.

23. The method of claim 20, including projecting a beam from the radar unit and directing the projected beam at the first target and a second target, wherein the second target comprises a movable target and is a location on the surface or structure of the at least one component of the railway vehicle brake assembly that moves to engage or disengage the railway vehicle brake; and determining from the movement of the surface or structure of the at least one component of the railway vehicle brake assembly that moves to engage or disengage the railway vehicle brake, a condition of the railway vehicle brake, wherein the condition is whether the railway vehicle brake is on or whether the railway vehicle brake is off.

* * * * *